(12) United States Patent
Xia et al.

(10) Patent No.: US 12,126,907 B2
(45) Date of Patent: Oct. 22, 2024

(54) CAMERA MODULE, ASSEMBLING METHOD THEREFOR, AND ELECTRONIC DEVICE

(71) Applicant: HONOR DEVICE CO., LTD., Guangdong (CN)

(72) Inventors: Taihong Xia, Shenzhen (CN); Chao Chen, Shenzhen (CN); Yanghua Yu, Shenzhen (CN); Shuai Yuan, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 17/915,230

(22) PCT Filed: Feb. 18, 2022

(86) PCT No.: PCT/CN2022/076955
§ 371 (c)(1),
(2) Date: Sep. 28, 2022

(87) PCT Pub. No.: WO2022/252699
PCT Pub. Date: Dec. 8, 2022

(65) Prior Publication Data
US 2024/0214681 A1 Jun. 27, 2024

(30) Foreign Application Priority Data
May 31, 2021 (CN) .......................... 202110605625.0

(51) Int. Cl.
H04N 23/68 (2023.01)
H04N 23/54 (2023.01)
H04N 23/55 (2023.01)

(52) U.S. Cl.
CPC .......... *H04N 23/687* (2023.01); *H04N 23/54* (2023.01); *H04N 23/55* (2023.01)

(58) Field of Classification Search
CPC ....... H04N 23/687; H04N 23/54; H04N 23/55
See application file for complete search history.

(56) References Cited

U.S. PATENT DOCUMENTS

| 5,508,884 A | 4/1996 | Brunet et al. |
| 8,498,070 B2 * | 7/2013 | Ke .......................... G02B 7/023 |
| | | 359/822 |

(Continued)

FOREIGN PATENT DOCUMENTS

| CN | 108322632 A | 7/2018 |
| CN | 111077715 A | 4/2020 |

(Continued)

*Primary Examiner* — Ahmed A Berhan
(74) *Attorney, Agent, or Firm* — Fish & Richardson P.C.

(57) ABSTRACT

A camera module, comprising a shell, a fixing bracket, a lens, a first driving assembly, a second driving assembly, and an image sensor assembly. The fixing bracket includes a first fixing portion and a second fixing portion. The first driving assembly is connected to a side of the first fixing portion facing the bottom of the shell. The first driving assembly includes a fixed member fixed to a bottom surface of the first fixing portion, a driving member connected to an image sensor assembly, and at least two shape memory alloy wires connected between the fixed member and the driving member and located on different sides of the first driving assembly. The shape memory alloy wires drive the image sensor assembly to move by extension and retraction.

20 Claims, 12 Drawing Sheets

(56) References Cited

U.S. PATENT DOCUMENTS

| | | | | |
|---|---|---|---|---|
| 10,447,931 B2* | 10/2019 | Hu | ................... | H04N 23/57 |
| 11,650,393 B2* | 5/2023 | Chang | ................ | H04N 23/687 |
| | | | | 359/557 |
| 2020/0174274 A1 | 6/2020 | Wang et al. | | |
| 2020/0379271 A1 | 12/2020 | Hu et al. | | |

FOREIGN PATENT DOCUMENTS

| | | |
|---|---|---|
| CN | 210573119 U | 5/2020 |
| CN | 212115444 U | 12/2020 |
| CN | 112291450 A | 1/2021 |
| CN | 112351187 A | 2/2021 |
| CN | 112736107 A | 4/2021 |
| CN | 112799202 A | 5/2021 |
| CN | 112865479 A | 5/2021 |
| CN | 113472978 A | 10/2021 |
| JP | 2008020811 A | 1/2008 |
| JP | 2011109611 A | 6/2011 |

* cited by examiner

CAMERA MODULE, ASSEMBLING METHOD THEREFOR, AND ELECTRONIC DEVICE

CROSS-REFERENCE TO RELATED APPLICATIONS

This application is a National Stage of International Application No. PCT/CN2022/076955, filed Feb. 18, 2022, which claims priority to Chinese Patent Application No. 202110605625.0, filed May 31, 2021, both of which are hereby incorporated by reference in their entireties.

TECHNICAL FIELD

This application relates to the technical field of mobile terminals, and in particular, to a camera module, an assembling method therefor, and an electronic device.

BACKGROUND

In life, people often use electronic devices (such as smart phones, tablet computers, and the like) to take pictures, and the quality of the pictures taken by the electronic device has become one of the important criteria to measure the performance of terminal devices.

A user often performs capturing by holding a portable electronic device (such as a mobile phone) by hand. Therefore, there is often a problem that the captured image is blurred due to hand shake. In order to solve the problem, some electronic devices have an optical anti-shake function. The amount of movement of the hand shake is offset by moving the lens or the image sensor of the camera module, so as to improve the quality of the captured image.

However, the current mainstream camera modules have many parts, complex assembly processes, and the difficulty with performance test.

SUMMARY

This application provides a camera module, an assembling method therefor, and an electronic device. The camera module has a simple structure, is easy to assemble, and has high reliability.

In a first aspect, this application provides a camera module, including a shell, a fixing bracket, a lens, a first driving assembly, a second driving assembly, and an image sensor assembly. A mounting hole is provided on a side surface of the shell, a part of the lens is accommodated in the shell through the mounting hole, the fixing bracket is arranged in the shell, and the image sensor assembly is located on a bottom of the shell. The fixing bracket includes a first fixing portion and a second fixing portion. The first fixing portion is sleeved outside the lens. One end of the second fixing portion is connected to a side of the first fixing portion facing the bottom of the shell, and an other end of the second fixing portion is supported on an inner bottom wall of the shell. At least one magnetic member is fixed to an inner edge of the first fixing portion.

The first driving assembly includes a fixed member, a driving member, and at least two shape memory alloy wires. The fixed member and the driving member are stacked along a direction of an optical axis of the lens. The fixed member is fixed to a surface of the first fixing portion facing the bottom of the shell, and the driving member is fixedly connected to the image sensor. The shape memory alloy wires are respectively located on different sides of the first driving assembly. One ends of the shape memory alloy wires are connected to the fixed member, and other ends of the shape memory alloy wires are connected to the driving member. The shape memory alloy wires are configured to drive, by extension and retraction of the shape memory alloy wires, the driving member to move.

The second driving assembly is sleeved on an outer wall of the lens and faces the magnetic member, and the magnetic member is configured to drive the second driving assembly to move.

In the camera module provided in this application, the fixing bracket is arranged in the shell. The fixing bracket includes a first fixing portion and a second fixing portion. The first fixing portion is sleeved outside a lens. One end of the second fixing portion is connected to a side of the first fixing portion facing the bottom of the shell, and an other end of the second fixing portion is supported on the bottom of the shell. The first driving assembly is connected to the side of the first fixing portion facing the bottom of the shell. The fixed member of the first driving assembly is fixed to the first fixing portion, the driving member of the first driving assembly is connected to the fixed member by the shape memory alloy wires, the driving member is driven to move by the shape memory alloy wires, and the driving member is configured to drive the image sensor assembly to move. The magnetic member is fixed to the inner edge of the first fixing portion and is configured to drive the second driving assembly sleeved on the outer wall of the lens to move, and the second driving assembly is configured to drive the lens to move. In this way, the first driving assembly and the magnetic member are both connected to the fixing bracket, thereby simplifying a structure of the camera module and reducing difficulty of assembling the camera module. In addition, the first driving assembly and the second driving assembly can be manufactured simultaneously and perform performance testing, so that the anti-shake performance of the camera module can be accurately tested, thereby improving the reliability of the camera module.

In a possible implementation, the second fixing portion includes a plurality of support portions arranged at intervals, and the first driving assembly and the image sensor assembly are located in a space defined by the plurality of support portions.

In a possible implementation, at least two magnetic members are fixed to the inner edge of the first fixing portion, and the two magnetic members are respectively arranged on two opposite sides of the first fixing portion.

At least two magnetic members are arranged opposite to each other, and the second driving assembly is driven to move by the magnetic members on both sides, so that the movement of the lens is more stable.

In a possible implementation, at least two protruding portions are arranged opposite to each other on the fixed member. Each of the protruding portions protrudes toward the driving member, and a position on the driving member corresponding to the protruding portion is in contact with the fixed member.

By arranging the protruding portions on the fixed member, the driving member is in contact with the protruding portions, and slits exist between the driving member and other positions of the fixed member, so that the driving member can move flexibly. The protruding portions are arranged on two opposite sides to ensure the balance of the driving member.

In a possible implementation, the fixed member has two sets of first claws. The two sets of first claws are arranged opposite to each other. The driving member has two sets of second claws. The two sets of second claws are arranged opposite to each other, and the first claws and the second claws are arranged at intervals.

The one ends of the shape memory alloy wires are connected to the first claws, and the other ends of the shape memory alloy wires are connected to the second claws.

In a possible implementation, the first driving assembly includes two shape memory alloy wires arranged adjacent or opposite to each other.

Two adjacent or opposite shape memory alloy wires are arranged, and the deformation and movement of the two shape memory alloy wires in different directions can drive the driving member to move toward any direction in a plane where the driving member is located.

In a possible implementation, the first driving assembly includes four shape memory alloy wires, and the shape memory alloy wires are connected to both sides of each set of first claws.

In a possible implementation, the first claws include a first engagement portion and a second engagement portion arranged separately. The first engagement portion and the second engagement portion are respectively connected to one ends of the shape memory alloy wires on two adjacent sides. A limiting space is formed between the first engagement portion and the second engagement portion.

The driving member has a limiting portion located in the limiting space and movable in the limiting space.

The first engagement portion and the second engagement portion are arranged separately to be respectively connected to the shape memory alloy wires on both sides, and the limiting space formed between the first engagement portion and the second engagement portion can limit the movement range of the driving member, thereby preventing excessive movement of the driving member from damage to the shape memory alloy wires.

In a possible implementation, the first engagement portion and the second engagement portion each include a bent portion, and are both connected to the fixed member by the bent portion, and the bent portion is bent toward the driving member.

The bent portion is arranged such that the first engagement portion and the second engagement portion are bent to the plane where the driving member is located, so that the first engagement portion and the second engagement portion can limit the movement range of the limiting portion of the driving member.

In a possible implementation, the fixed member includes a substrate and at least one conductive plate. One side surface of the substrate is fixedly connected to the first fixing portion, and the conductive plate is fixed to an other side surface of the substrate.

The protruding portions are arranged on the substrate, and the first claws and the second claws are arranged on the conductive plate.

The substrate is arranged as a carrier of the conductive plate to facilitate connection the fixed member to the first fixing portion, and the first claws and the second claws are arranged on the conductive plate to facilitate processing and forming of the first claws and the second claws.

In a possible implementation, the fixed member includes four conductive plates, and the first engagement portions and the second engagement portions of the two sets of first claws are respectively located on different conductive plates.

The first engagement portions and the second engagement portions of the two sets of first claws are separately arranged on the four conductive plates to facilitate processing and forming of the first engagement portions and the second engagement portions.

In a possible implementation, the second driving assembly includes a support seat and a second driving coil. The support seat is sleeved on the outer wall of the lens, and the second driving coil is sleeved on an outer wall of the support seat.

The second driving coil is driven to move by generating a magnetic force between the second driving coil and the magnetic member and changing a magnitude and a direction of a current in the second driving coil, and the second driving coil is fixed to the outer wall of the lens by the support seat, so that the second driving coil drives the lens to move.

In a possible implementation, the image sensor assembly includes an image sensor, a gap exists between a heat dissipation surface of the image sensor and the inner bottom wall of the shell, and the gap is filled with a heat transfer fluid.

The gap between the image sensor and the inner bottom wall of the shell is filled with the heat transfer fluid, and the heat dissipation surface of the image sensor comes into contact with the heat transfer fluid. The image sensor is dissipated by the thermal conduction of the heat transfer fluid, thereby improving the heat dissipation efficiency of the image sensor.

In a possible implementation, an annular sealing plate is attached to the inner bottom wall of the shell, and the heat transfer fluid is located in an area defined by the annular sealing plate.

The heat transfer fluid is sealed by the annular sealing plate, and the coverage area of the heat transfer fluid is limited, so that the area where the heat transfer fluid is located corresponds to the heat dissipation surface of the image sensor.

In a possible implementation, a slit exists between the annular sealing plate and the image sensor.

The heat transfer fluid absorbs the heat of the image sensor and expands, and the heat transfer fluid overflows. The slit is reserved between the surface of the annular sealing plate and the image sensor to accommodate the overflowing heat transfer fluid, which reserves a flowing space for the heat transfer fluid.

In a possible implementation, a plurality of sealing holes are provided at intervals on the annular sealing plate, or a surface of the annular sealing plate is an uneven corrugated surface.

The overflowing heat transfer fluid is stored in the sealing hole on the annular sealing plate, and the heat transfer fluid is prevented from overflowing outside the annular sealing plate due to a surface tension of the heat transfer fluid in the slit between the annular sealing plate and the image sensor. The overflowing heat transfer fluid is stored in a recessed area on the corrugated surface of the annular sealing plate, and the heat transfer fluid is prevented from overflowing outside the annular sealing plate due to a surface tension of the heat transfer fluid in the slit between a top portion of a protruding area on the corrugated surface and the image sensor.

In a possible implementation, a plurality of elongated grooves are provided at intervals on the annular sealing plate, and the elongated grooves extend along a direction of a contour line of the annular sealing plate. A plurality of rows of elongated grooves are provided from an inner edge to an outer edge of the annular sealing plate, and the elongated grooves in different rows are staggered.

The plurality of elongated grooves extending along the direction of the contour line of the sealing plate are provided at intervals on the sealing plate, and the elongated grooves can store the overflowing heat transfer fluid and prevent the heat transfer fluid from overflowing to outside of the annular sealing plate. In addition, the elongated grooves provided at intervals have little impact on the strength of the annular sealing plate. Moreover, the elongated grooves in different rows are staggered, which can prevent the heat transfer fluid from continuing to overflow after passing through the elongated grooves.

In a possible implementation, the image sensor assembly further includes a flexible electrical connector. One end of the flexible electrical connector is connected to the image sensor, and an other end of the flexible electrical connector is configured to be connected to an external circuit.

In a possible implementation, the flexible electrical connector includes a connecting portion, a movable cantilever, and a mounting portion. The connecting portion is connected to the image sensor, the mounting portion is connected to the external circuit, and the movable cantilever is located between the connecting portion and the mounting portion.

The movable cantilever surrounds the image sensor at least half a circle.

The movable cantilever is arranged, so that the image sensor moves to drive the deformation and movement of the movable cantilever, so as to prevent the flexible electrical connector from restricting the displacement of the image sensor. The movable cantilever is arranged to surround the image sensor at least half a circle, and the movable cantilever includes at least two parts extending along different directions, so that the movable cantilever can ensure that the image sensor moves toward any direction in a plane where the image sensor is located.

In a second aspect, this application provides a method for assembling a camera module, for assembling the camera module according to any one of the above. The assembling method includes:

arranging a lens, and sleeving a second driving assembly on an outer wall of the lens;

arranging a fixing bracket, where the fixing bracket includes a first fixing portion and a second fixing portion, and the second fixing portion is connected to a bottom surface of the first fixing portion;

fixing at least one magnetic member to an inner edge of the first fixing portion;

sleeving, outside the lens, the fixing bracket having the magnetic member fixed thereto, where the second driving assembly faces the magnetic member;

arranging a first driving assembly, where the first driving assembly includes a fixed member, a driving member, a shape memory alloy wire connected between the fixed member and the driving member, where at least two shape memory alloy wires are arranged, and each of the shape memory alloy wires is located on a different side of the first driving assembly;

fixing the fixed member to the bottom surface of the first fixing portion;

arranging an image sensor assembly, and fixing the image sensor assembly to the driving member; and sleeving a shell outside the fixing bracket.

In a third aspect, this application provides an electronic device, including at least one camera module according to any one of the above.

The electronic device provided in this application includes at least one camera module. In the camera module, the fixing bracket is arranged in a shell. The fixing bracket includes a first fixing portion and a second fixing portion. The first fixing portion is sleeved outside a lens. One end of the second fixing portion is connected to a side of the first fixing portion facing the bottom of the shell, and an other end of the second fixing portion is supported on the bottom of the shell. The first driving assembly is connected to the side of the first fixing portion facing the bottom of the shell. The fixed member of the first driving assembly is fixed to the first fixing portion, the driving member of the first driving assembly is connected to the fixed member by the shape memory alloy wires, the driving member is driven to move by the shape memory alloy wires, and the driving member is configured to drive the image sensor assembly to move. The magnetic member is fixed to the inner edge of the first fixing portion and is configured to drive the second driving assembly sleeved on the outer wall of the lens to move, and the second driving assembly is configured to drive the lens to move. In this way, the first driving assembly and the magnetic member are both connected to the fixing bracket, thereby simplifying a structure of the camera module and reducing difficulty of assembling the camera module. In addition, the first driving assembly and the second driving assembly can be manufactured simultaneously and perform performance testing, so that the anti-shake performance of the camera module can be accurately tested, thereby improving the reliability of the camera module.

DESCRIPTIONS OF REFERENCE NUMERALS

100-Electronic device;
1-Camera module; 2-Housing; 21-Rear cover; 211-Light-transmitting hole; 22-Middle frame; 3-Display panel; 4-Circuit board;
11-Shell; 12-Fixing bracket; 13-Lens; 14-First driving assembly; 15-Second driving assembly; 16-Image sensor assembly; 17-Magnetic member; 18-Heat transfer fluid; 19-Annular sealing plate;
111-Outer frame; 112-Bottom plate; 121-First fixing portion; 122-Second fixing portion; 141-Fixed member; 142-Driving member; 143-Shape memory alloy wire (SMA wire); 144-Light exit hole; 151-Support seat; 152-Second driving coil; 161-Image sensor; 162-Flexible electrical connector; 163-Light-transmitting plate; 191-Sealing hole; 192-Elongated groove;
1111-Mounting hole; 1221-Support portion; 1411-Substrate; 1412-Conductive plate; 1413-First claw; 1421-Second claw; 1422-Limiting portion; 1423-Hollowed-out area; 1431-First SMA wire; 1432-Second SMA wire; 1433-Third SMA wire; 1621-Connecting portion; 1622-Movable cantilever; 1623-Mounting portion;
1411a-Protruding portion; 1412a-Electrical connection terminal; 1412b-Avoidance area; 1413a-First engagement portion; 1413b-Second engagement portion; 1413c-Bent portion; 1421a-First engagement end; 1421b-Second engagement end.

DESCRIPTION OF EMBODIMENTS

Terms used in implementations of this application are merely used to explain specific embodiments of this application, but are not intended to limit this application.

Figure 1:
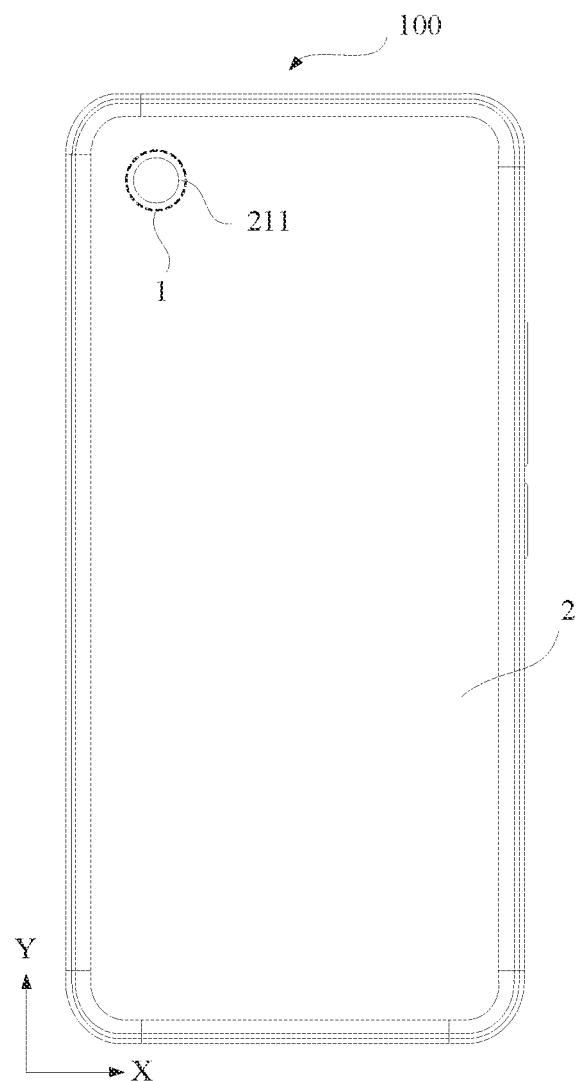
FIG. 1 is a schematic structural diagram of an electronic device according to an embodiment of this application.
Figure 2:
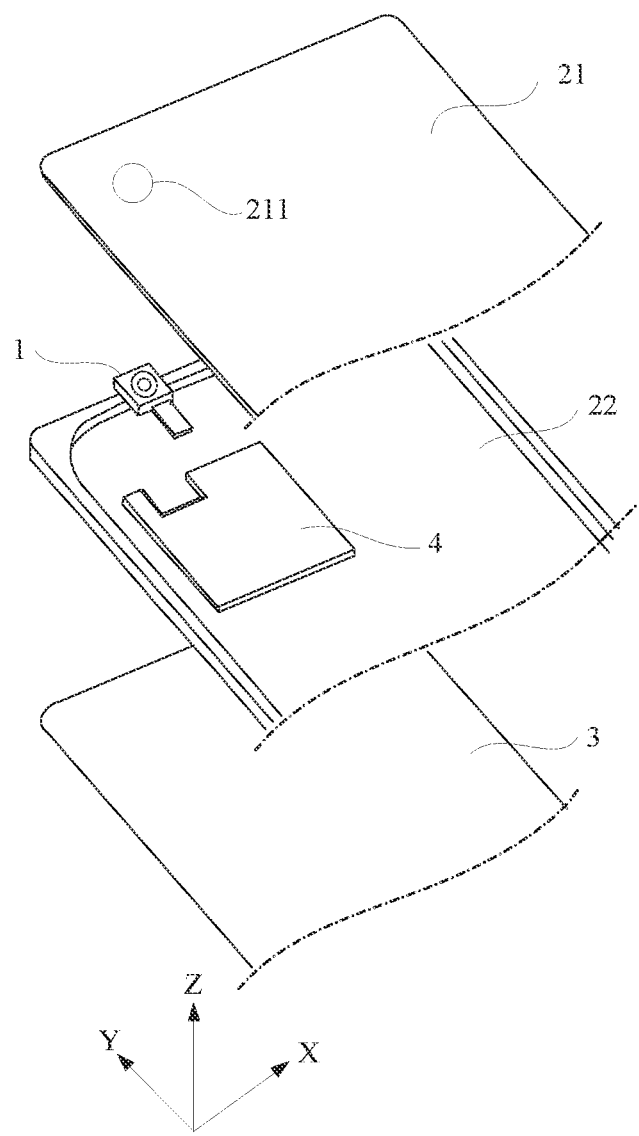
FIG. 2 is a partial exploded view of FIG. 1.

With the continuous advancement of science and technology, the capturing function has gradually become the basic configuration of mobile terminals such as a mobile phone, a tablet computer, a notebook computer, a personal digital assistant (Personal Digital Assistant, PDA), a smart wearable device, and a point of sales (Point of Sales, POS), and the like FIG. 1 is a schematic structural diagram of an electronic device according to an embodiment of this application, and FIG. 2 is a partial exploded view of FIG. 1. Referring to FIG. 1 and FIG. 2, a mobile phone is used as an example to describe an electronic device 100 of this application. It should be understood that the electronic device 100 in this embodiment includes, but is not limited to, a mobile phone, and may further be a mobile terminal such as the tablet computer, the notebook computer, the PDA, the smart wearable device, the POS, or the like.

Referring to FIG. 1 and FIG. 2, the electronic device 100 may include a housing 2, a display panel 3, a camera module 1, and a circuit board 4. The housing 2 surrounds a back side and a side surface of the electronic device 100. The display panel 3 is mounted on the housing 2. The display panel 3 and the housing 2 jointly define an accommodating space of the electronic device 100, and the camera module 1 and the circuit board 4 are both mounted in the accommodating space. In addition, devices such as a microphone, a speaker, or a battery may further be arranged in the accommodating space.

As shown in FIG. 1, the camera module 1 is located in an area of a top portion of the housing 2 close to an edge. It may be understood that a position of the camera module 1 is not limited to the position shown in FIG. 1.

Referring to FIG. 2, in some embodiments, the housing 2 may include a rear cover 21 and a middle frame 22. A light-transmitting hole 211 is provided on the rear cover 21. The camera module 1 may be arranged on the middle frame 22, and is configured to collect external ambient light through the light-transmitting hole 211 on the rear cover 21. A light-sensitive surface of the camera module 1 is arranged opposite to the light-transmitting hole 211. The external ambient light passes through the light-transmitting hole 211 to illuminate the light-sensitive surface. The light-sensitive surface is used for collecting the external ambient light. The camera module 1 is configured to convert an optical signal to an electrical signal to realize the capturing function.

FIG. 2 shows that one camera module 1 is arranged in the electronic device 100. It should be noted that in practical application, a number of camera modules 1 is not limited to one, and the number of camera modules 1 may also be two or more than two. When a plurality of camera modules 1 are arranged, the plurality of camera modules 1 may be arbitrarily arranged in an X-Y plane. For example, the plurality of camera modules 1 are arranged along an X-axis direction or a Y-axis direction.

In addition, the camera module 1 includes, but is not limited to, being an auto focus (Auto Focus, AF) module, a fix focus (Fix Focus, FF) module, a wide-angle camera module 1, a telephoto camera module 1, a color camera module 1, or black and white camera module 1. The camera module 1 in the electronic device 100 may include any one of the above camera modules 1, or include two or more of the above camera modules 1. When the number of camera modules 1 is two or more, two or more camera modules 1 may be integrated into one camera assembly.

Referring to FIG. 2, the camera module 1 may be electrically connected to the circuit board 4. The circuit board 4 is, for example, a main board in the electronic device 100. As an implementation, the camera module 1 may be electrically connected to the main board by an electrical connector. For example, a receptacle of the electrical connector is arranged on the camera module 1, and a plug of the electrical connector is arranged on the main board. The receptacle is inserted into the plug to electrically connect the camera module 1 to the main board. For example, a processor is arranged on the main board, and the camera module 1 is controlled by the processor to capture an image. When the user inputs a capturing instruction, the processor receives the capturing instruction, and controls, according to the capturing instruction, the camera module 1 to capture a to-be-captured object.

The camera module 1 in the electronic device 100 according to the embodiment of this application is described in detail below.

Figure 3:
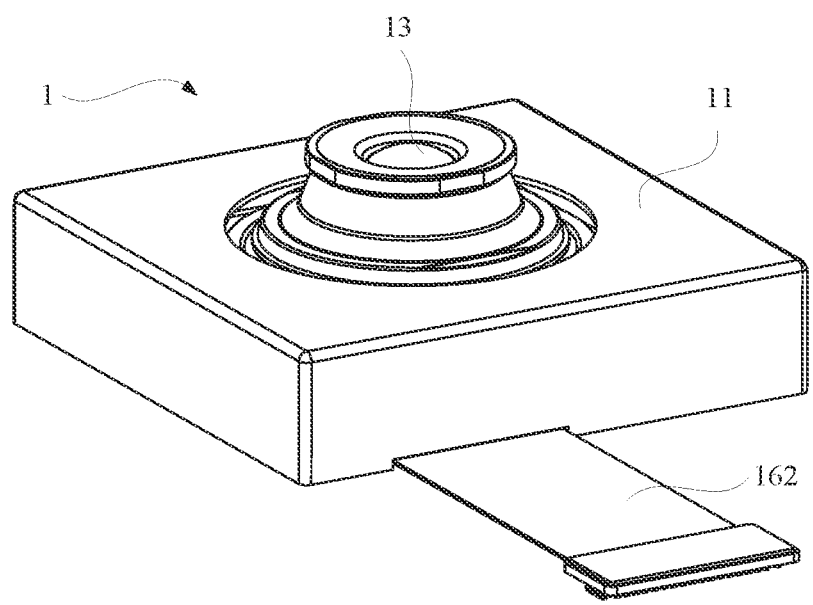
FIG. 3 is a schematic structural diagram of a camera module according to an embodiment of this application.
Figure 4:
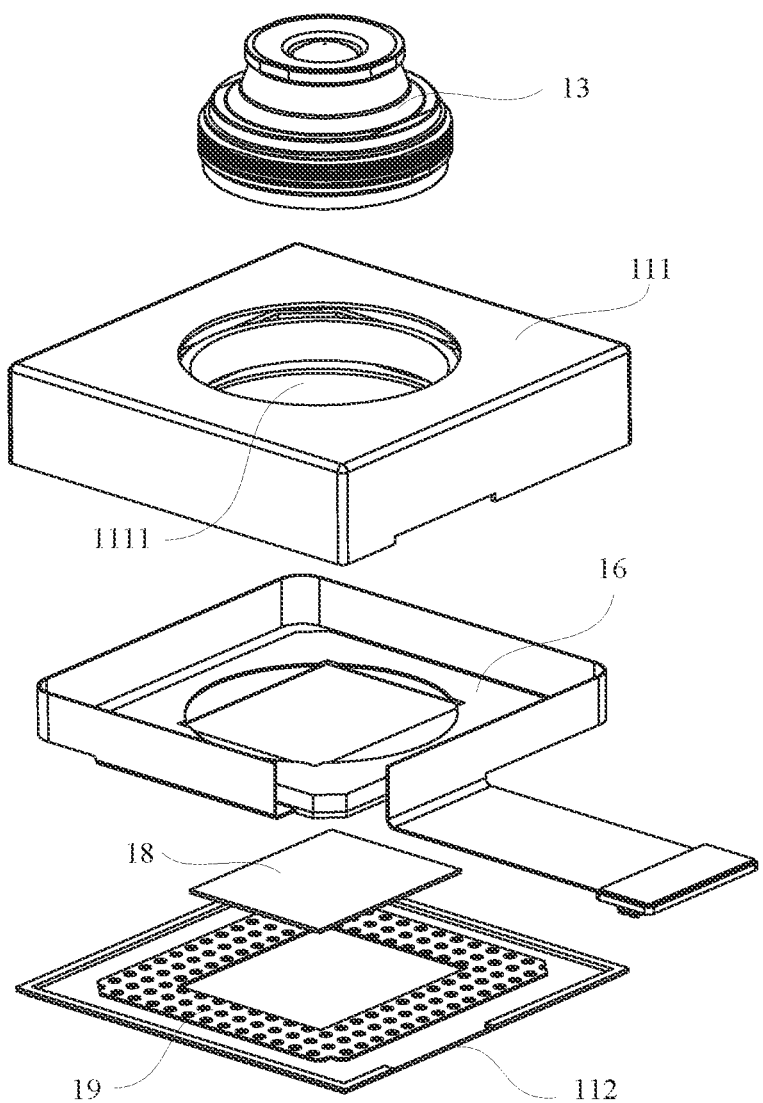
FIG. 4 is an exploded view of FIG. 3.

FIG. 3 is a schematic structural diagram of a camera module according to an embodiment of this application, and FIG. 4 is an exploded view of FIG. 3. Referring to FIG. 3 and FIG. 4, the camera module 1 of this embodiment includes a shell 11, a lens 13, and an image sensor assembly 16. A mounting hole 1111 is provided on a side surface of the shell 11, and an interior of the shell 11 is hollow to form an accommodating space. The lens 13 is mounted to the shell 11 through the mounting hole 1111. A part of the lens 13 is located in the accommodating space in the shell 11, and an other part of the lens 13 is exposed outside the shell 11. The image sensor assembly 16 is arranged in the shell 11. For example, the image sensor assembly 16 is arranged on a bottom of the shell 11.

Figure 5:
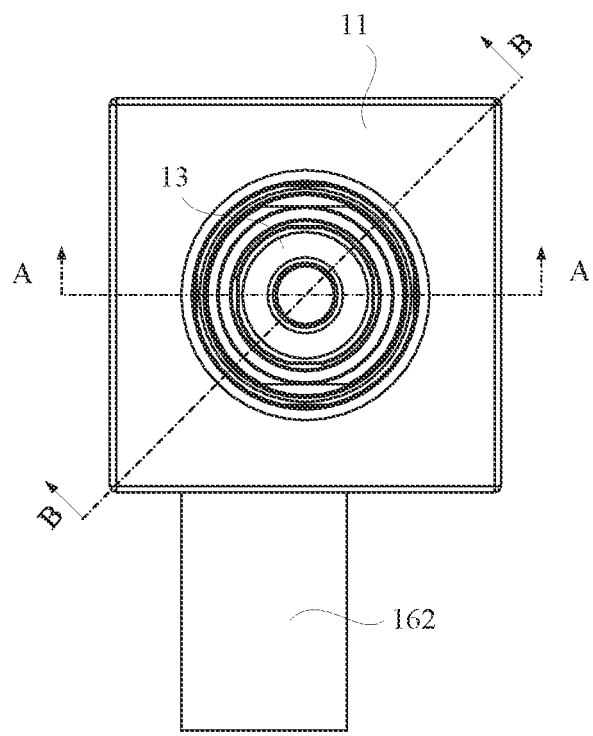
FIG. 5 is a front view of FIG. 3.
Figure 6:
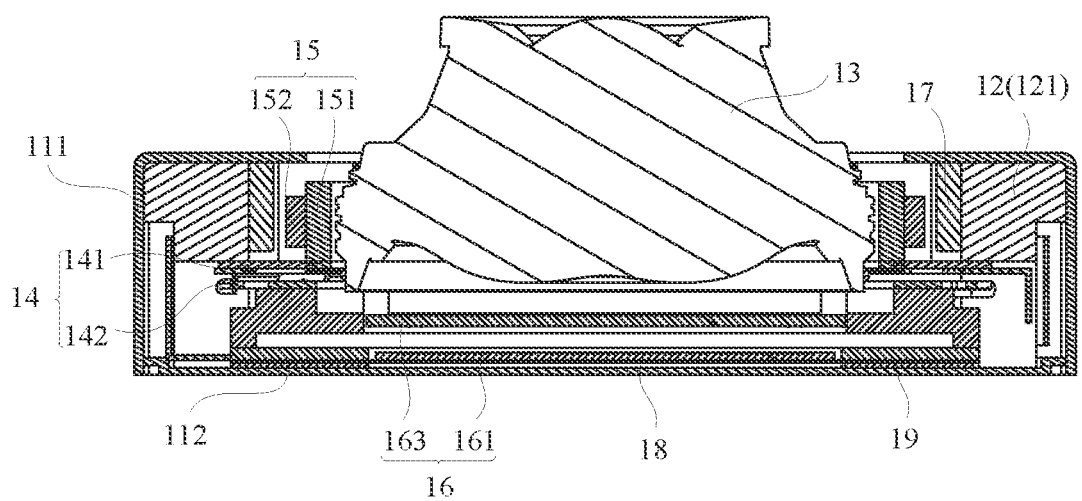
FIG. 6 is a cross-sectional view taken along line A-A in FIG. 5.
Figure 7:
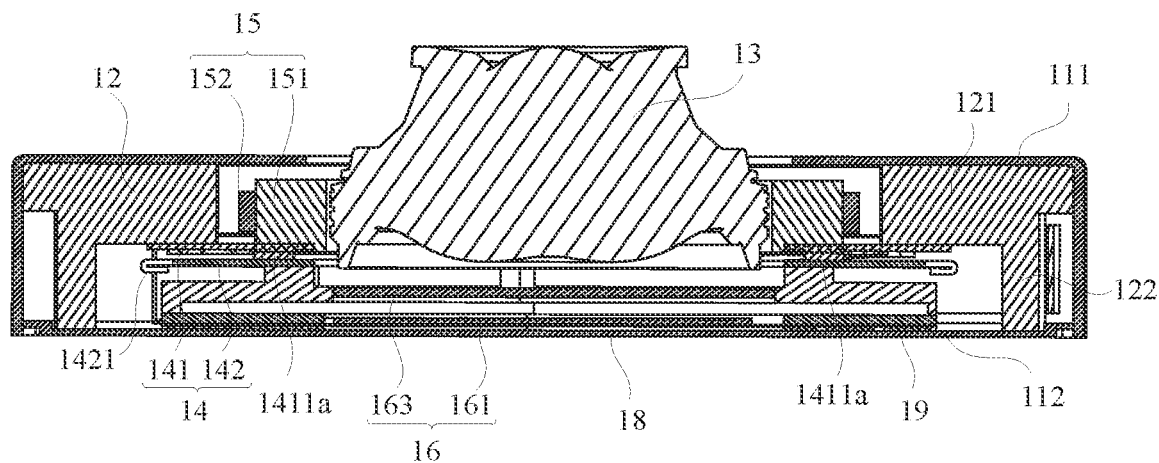
FIG. 7 is a cross-sectional view taken along line B-B in FIG. 5.

FIG. 5 is a front view of FIG. 3, FIG. 6 is a cross-sectional view taken along line A-A in FIG. 5, and FIG. 7 is a cross-sectional view taken along line B-B in FIG. 5. Referring to FIG. 6 and FIG. 7, a light entry side of the lens 13 is located outside the shell 11, and a light exit side of the lens 13 is located inside the shell 11. For example, the light entry side of the lens 13 corresponds to the light-transmitting hole on the rear cover of the electronic device, and the external ambient light enters the lens 13 from the light entry side of the lens 13 through the light-transmitting hole. The lens 13 is composed of, for example, one or more stacked lenses. An optical axis of the lens 13 passes through the center of the lens. The lens condenses incident light, and the condensed light is emitted from the light exit side of the lens 13.

The image sensor assembly 16 is located on a light exit path of the lens 13. For example, the image sensor assembly 16 is located on the light exit side of the lens 13, and the optical axis of the lens 13 passes through the center of the image sensor assembly 16. The light emitted from the lens 13 enters the image sensor assembly 16, and a light emitting signal is converted to an electrical signal by photovoltaic conversion of the image sensor assembly 16, so as to realize the imaging function of the camera module 1.

Referring to FIG. 4, in this embodiment, the shell 11 may include an outer frame 111 and a bottom plate 112. The outer frame 111 and the bottom plate 112 jointly define an accommodating space of the shell 11. The detachable bottom plate 112 is arranged to facilitate mounting of the lens 13, the image sensor assembly 16, and other devices of the camera module 1 in the shell 11. The mounting hole 1111 is located on a side surface of the outer frame 111 opposite to the bottom plate 112, the lens 13 is mounted in the shell 11 through the mounting hole 1111 along the optical axis of the lens, and the image sensor assembly 16 is arranged close to the bottom plate 112.

Still referring to FIG. 6 and FIG. 7, the camera module 1 of this embodiment further includes a first driving assembly 14 and a second driving assembly 15. The first driving assembly 14 and the second driving assembly 15 are arranged in the shell 11. Specifically, the first driving assembly 14 is configured to drive the image sensor assembly 16 to move. For example, the first driving assembly 14 can drive the image sensor assembly 16 to translate or rotate, in the direction perpendicular to the optical axis of the lens 13, in a plane where the image sensor assembly is located, so as to realize the anti-shake function of the camera module 1. The second driving assembly 15 is configured to drive the lens 13 to move. For example, the second driving assembly 15 can drive the lens 13 to move along the optical axis of the lens, so as to realize the focusing function of the camera module 1.

Figure 8:
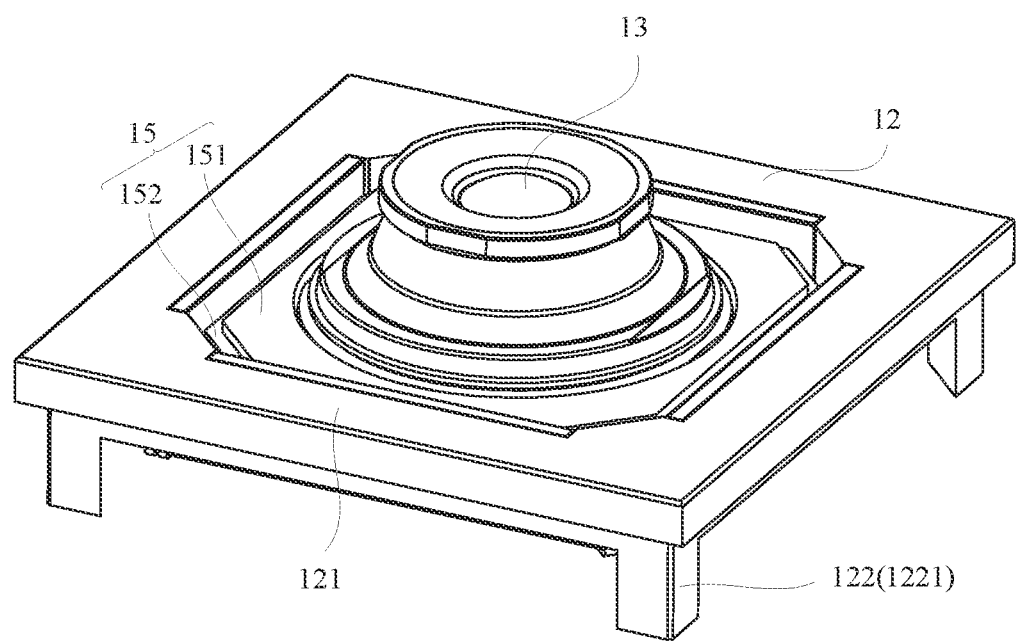
FIG. 8 is a schematic diagram of an inner structure of a camera module according to an embodiment of this application.
Figure 9:
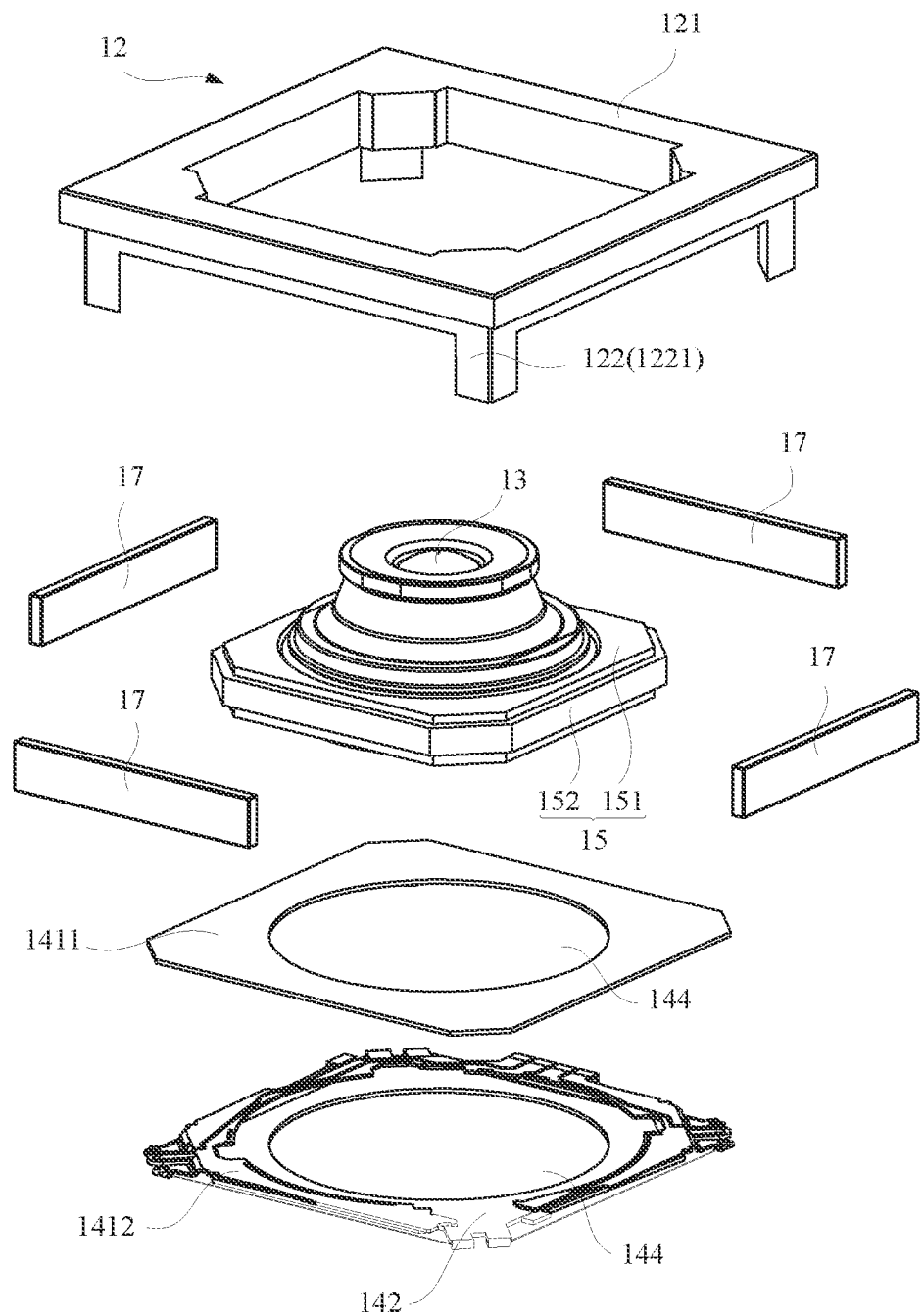
FIG. 9 is an exploded view of FIG. 8.

In the camera module 1 of this embodiment, a fixing bracket 12 is further arranged in the shell 11, and the first driving assembly 14 and the second driving assembly 15 are movably mounted in the shell 11 by using the fixing bracket 12. FIG. 8 is a schematic diagram of an inner structure of a camera module according to an embodiment of this application, and FIG. 9 is an exploded view of FIG. 8. Referring to FIG. 8 and FIG. 9, the fixing bracket 12 is sleeved outside the lens 13. The fixing bracket 12 includes a first fixing portion 121 and a second fixing portion 122. One end of the second fixing portion 122 is connected to a side of the first fixing portion 121 facing a bottom of the shell 11, and an other end of the second fixing portion 122 is supported on an inner bottom wall of the shell 11.

Figure 10:
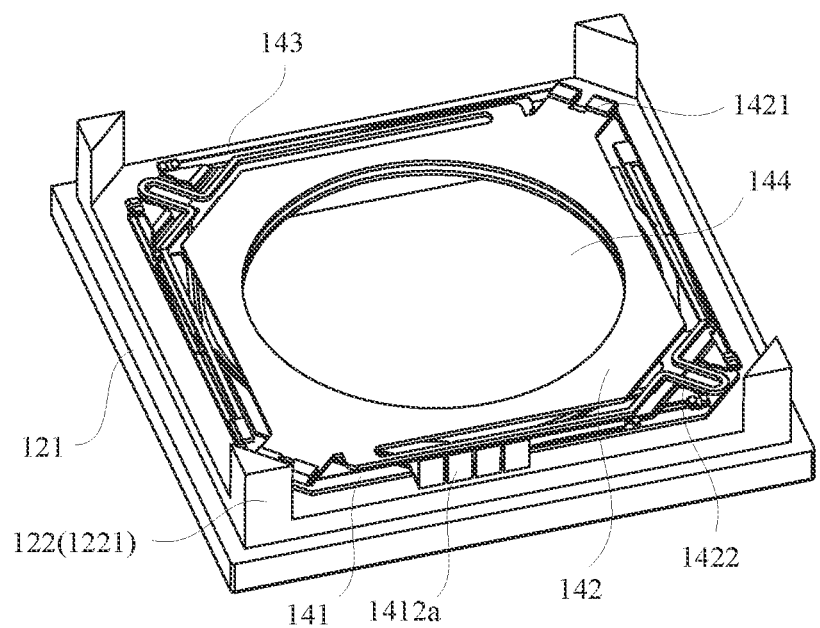
FIG. 10 is a schematic diagram of assembling of a first driving assembly and a fixing bracket.

The first fixing portion 121 is located outside the lens 13. For example, the first fixing portion 121 is an annular portion surrounding the outside of the lens 13. FIG. 10 is a schematic diagram of assembling of a first driving assembly and a fixing bracket. Referring to FIG. 10, the first driving assembly 14 is connected to a side surface of the first fixing portion 121 facing a bottom plate 112 of the shell 11. A part of the first driving assembly 14 is fixed to the first fixing portion 121, and an other part of the first driving assembly 14 is movable relative to the first fixing portion 121. The image sensor assembly 16 is connected to the movable part of the first driving assembly 14, and the movable part of the first driving assembly 14 is configured to drive the image sensor assembly 16 to move.

In an implementation, the movable part of the first driving assembly 14 can translate or rotate in a plane where the movable part is located, and drive the image sensor assembly 16 to translate or rotate in a plane where the image sensor assembly is located. The movement of the image sensor assembly 16 compensates for the displacement caused by the shaking of the user hand, so as to prevent blurring of the captured image, thereby improving the clarity of the image, and enhancing the quality of the image captured by the camera module 1.

Referring to FIG. 7, the fixing bracket 12 is supported on the bottom plate 112 of the shell 11 by the second fixing portion 122, and the second fixing portion 122 defines a space between the first fixing portion 121 and the bottom plate 112. Since the first driving assembly 14 and the image sensor assembly 16 are successively connected to a surface of the first fixing portion 121 facing the bottom plate 112, the space between the first fixing portion 121 and the bottom plate 112 is used for accommodating at least the first driving assembly 14 and the image sensor assembly 16. It should be noted that a distance between the first fixing portion 121 and the bottom plate 112 should be greater than an overall height of the first driving assembly 14 and the image sensor assembly 16. In this way, a gap exists between the image sensor assembly 16 and the bottom plate 112, and the bottom plate 112 does not hinder the movement of the image sensor assembly 16.

In a specific implementation, the second fixing portion 122 may include a plurality of support portions 1221 arranged at intervals. The support portions 1221 are all connected to a side surface of the first fixing portion 121 facing the bottom of the shell 11. The first driving assembly 14 and the image sensor assembly 16 are located in a space defined by the support portions 1221. Referring to FIG. 9, a contour of an outer edge of the first fixing portion 121 is a rectangular structure by way of example. Four support portions 1221 may be arranged and are respectively located at four corners of the first fixing portion 121.

The second driving assembly 15 is sleeved outside the lens 13, for example, the second driving assembly 15 is fixed to an outer wall of the lens 13. At least one magnetic member 17 is fixed to an inner edge of the first fixing portion 121 close to an outer side wall of the lens 13. The second driving assembly 15 is located inside the inner edge of the first fixing portion 121 and faces the magnetic member 17, the magnetic member 17 is configured to drive the second driving assembly 15 to move, and the movement of the second driving assembly 15 can drive the lens 13 to move.

Specifically, the second driving assembly 15 may generate a magnetic field, and a magnetic force may be generated between the second driving assembly 15 and the magnetic member 17. The second driving assembly 15 is driven to move by changing the magnetic force between the second driving assembly 15 and the magnetic member 17. For example, the magnetic member 17 drives the second driving assembly 15 to move along an optical axis of the lens 13, and the second driving assembly 15 drives the lens 13 to move along the optical axis, to adjust a focal length of the lens 13. In addition, at least two magnetic members 17 may be fixed to the inner edge of the first fixing portion 121. Two magnetic members 17 are used as an example. The two magnetic members 17 may be arranged on two opposite sides of the first fixing portion 121. The second driving assembly 15 is driven by the two magnetic members 17 to move, so that the driving force of the magnetic member 17 to the second driving assembly 15 can be enhanced. In addition, the two magnetic members 17 are arranged opposite to each other, so as to ensure that the second driving assembly 15 drives the lens 13 to move smoothly, thereby preventing the lens 13 from being deflected during the movement.

It should be noted that a number of the magnetic members 17 fixed to the inner edge of the first fixing portion 121 may further be three, four, five, six, eight, or the like, which is not limited in this embodiment. A plurality of magnetic members 17 may be arranged at an equal interval along a circumferential direction of the first fixing portion 121. Alternatively, the number of the magnetic members 17 is an even number, and the plurality of magnetic members 17 are arranged opposite to each other in pairs.

For example, the housing of the camera module 1 may be, for example, a cuboid shape. For example, a cross-sectional shape of the housing along a direction perpendicular to an axial direction of the lens 13 is a rectangle. The first fixing portion 121 of the fixing bracket 12 matching the shape of the shell 11 may be a rectangular frame structure, and a part of the lens 13 extends through an area defined by the rectangular frame. Two or four magnetic members 17 opposite to each other in pairs are arranged on the inner edge of the first fixing portion 121 by way of example. A contour of the inner edge of the rectangular frame may be a rectangle. If six or eight magnetic members 17 opposite to each other in pairs are arranged on the inner edge of the first fixing portion 121, the contour of the inner edge of the rectangular frame may be correspondingly a hexagon or an octagon.

It should be noted that, referring to FIG. 9, the fixing bracket 12 may be integrally formed. The first fixing portion 121 and the second fixing portion 122 are formed as a whole, and the second fixing portion 122 is formed on the side of the first fixing portion 121 facing the bottom of the shell 11.

In other embodiments, the first fixing portion 121 and second fixing portion 122 may also be designed and processed separately, and are connected together to form the fixing bracket 12. For example, the first fixing portion 121 and the second fixing portion 122 are bonded, welded, or connected by connectors such as bolts, screws, rivets, and the like. Therefore, the first fixing portion 121 may be an annular member, and the second fixing portion 122 may include a plurality of individual support portions 1221. Alternatively, the second fixing portion 122 includes an annular portion as a main body. The annular portion matches the first fixing portion 121 and is attached and connected to the first fixing portion 121. The support portions 1221 are connected to the annular portion.

In this embodiment, the fixing bracket 12 is arranged. The fixing bracket 12 includes a first fixing portion 121 and a second fixing portion 122. The second fixing portion 122 is connected to the first fixing portion 121 and supported on the bottom plate 112 of the shell 11. The first driving assembly 14 is connected to a side surface of the first fixing portion 121 facing the bottom plate 112. A fixed part of the first driving assembly 14 is connected to the first fixing portion 121, and a movable part of the first driving assembly 14 is connected to the image sensor assembly 16. The first driving assembly 14 is configured to drive the image sensor assembly 16 to move. The magnetic members 17 are fixed to the inner edge of the first fixing portion 121 and drive the second driving assembly 15 sleeved on the outer wall of the lens 13 to move, and the second driving assembly 15 is configured to drive the lens 13 to move. In this way, the first driving assembly 14 and the magnetic members 17 driving the second driving assembly 15 to move are all connected to the fixing bracket 12, thereby simplifying a structure of the camera module 1 and reducing the difficulty of assembling the camera module 1. In addition, the first driving assembly 14 and the second driving assembly 15 can be manufactured simultaneously and perform performance testing, so that the anti-shake performance of the camera module 1 can be accurately tested, thereby improving the reliability of the camera module 1.

Figure 11:
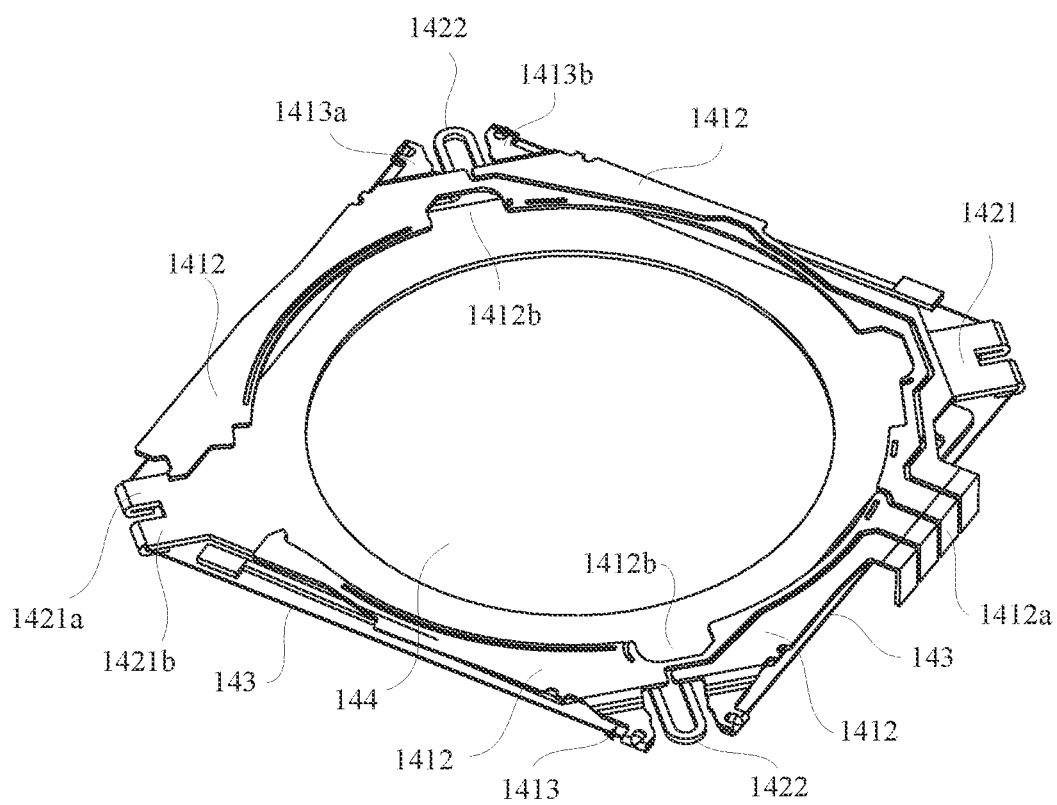
FIG. 11 is a front view of a first driving assembly.
Figure 12:
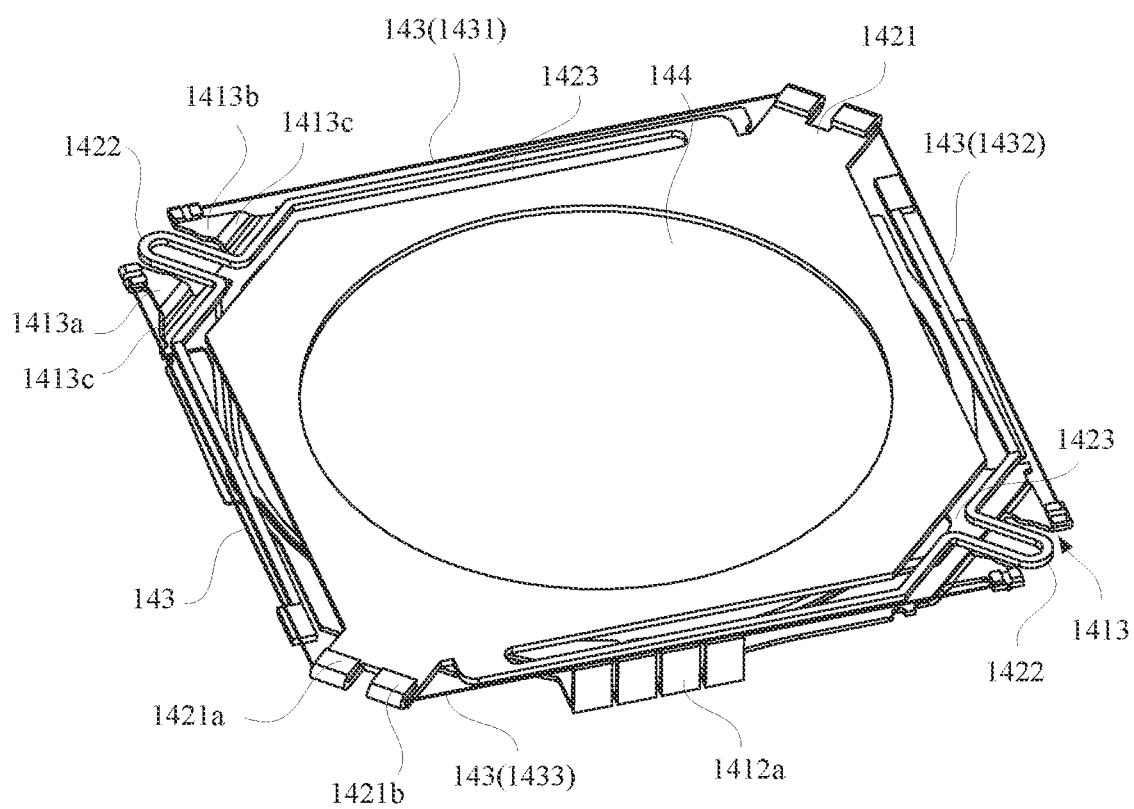
FIG. 12 is a rear view of a first driving assembly.

FIG. 11 is a front view of a first driving assembly, and FIG. 12 is a rear view of a first driving assembly. Referring to FIG. 11 and FIG. 12, in this embodiment, the first driving assembly 14 includes a fixed member 141, a driving member 142, and shape memory alloy wires 143. One side surface of the fixed member 141 is fixedly connected to a side surface of the first fixing portion 121 facing the bottom plate 112 of the shell 11. The driving member 142 is located on an other side of the fixed member 141. For example, the driving member 142 is stacked below the fixed member 141 along a direction of the optical axis of the lens 13, and the image sensor assembly 16 is connected to a side surface of the driving member 142 facing the bottom plate 112 of the shell 11. The driving member 142 is connected to the fixed member 141 by the shape memory alloy wires 143, and the driving member 142 is moved relative to the fixed member 141 by using the characteristics of the shape memory alloy wire 143, so that the driving member 142 drives the image sensor assembly 16 to move.

It should be noted that the shape memory alloy (Shape Memory Alloys, SMA) is an alloy material that can completely eliminate its deformation at a lower temperature after heating and restore its original shape before deformation, that is, an alloy having a "memory" effect. The SMA is a thermoelastic martensitic phase transformation material, which may undergo phase transformation when the temperature changes, and the stress state also changes. At a low temperature, the SMA is in a state of a martensitic phase. When the temperature increases, the SMA is transformed from the martensite phase into an austenite phase, and deforms and is contracted.

Therefore, a current may be applied to the shape memory alloy wire 143 (referred to as the SMA wire 143 for short below), and the SMA wire 143 is heated up by using the heating effect of a current, so as to realize the contraction and deformation of the SMA wire 143. When no current flows through the SMA wire 143, the SMA wire can return to its original state. In this way, the driving member 142 may be driven to move by the deformation of the SMA wire 143 during status change when energized.

Specifically, the SMA wire 143 extends along a plane where the first driving assembly 14 is located. One end of the SMA wire 143 is connected to the fixed member 141, and an other end of the SMA wire 143 is connected to the driving member 142. For example, the SMA wire 143 extends along a side edge of the first driving assembly 14, and two ends of the SMA wire 143 respectively extend to two ends of the first driving assembly 14. In an unenergized state, the SMA is in a stretched state. When the SMA wire 143 is energized, the SMA wire 143 is contracted due to a temperature increase. Since an end of the SMA wire 143 connected to the fixed member 141 is fixed, an end of the SMA wire 143 connected to the driving member 142 moves toward an other end of the SMA wire 143. Therefore, the SMA wire 143 is contracted and is configured to drive the driving member 142 to move.

Referring to FIG. 12, in this embodiment, at least two SMA wires 143 are connected between the fixed member 141 and the driving member 142. Different SMA wires 143 are respectively located on different sides of the first driving assembly 14. In this way, different SMA wires 143 are contracted in different directions in the energized state, so as to drive the driving member 142 to move in different directions. Therefore, a magnitude and a direction of the current in different SMA wires 143 are controlled, so that the driving member 142 can move arbitrarily in the plane where the first driving assembly 14 is located. For example, the SMA wire 143 drives the driving member 142 to translate or rotate relative to the fixed member 141.

Two SMA wires 143 are used as an example. The two SMA wires 143 are located on different sides of the first driving assembly 14, and the driving member 142 may be driven to translate relative to the fixed member 141 by causing both the SMA wires 143 to be contracted in a certain direction or toward a certain position. The two SMA wires 143 are contracted in different directions and toward different positions, the driving member 142 may be driven to rotate relative to the fixed member 141.

As for applying a current to each of the SMA wires 143, in some embodiments, both the fixed member 141 and the driving member 142 are conductive members, and one of the fixed member 141 and the driving member 142 is electrically connected to an external circuit (for example, a circuit board 4 in an electronic device) to apply the current to the SMA wire 143. For example, when a user performs capturing, the circuit board 4 applies a current to the SMA wire 143 when the electronic device detects that the movement of the first driving assembly 14 is required to compensate for the shaking of the user hand. In addition, the magnitude and the direction of the current in the SMA wire 143 are controlled according to an amount and a direction of movement required for compensation, and the SMA wire 143 is contracted by a certain amount in the corresponding direction due to the temperature increase after energized, so as to drive the driving member 142 to move. The driving member 142 is configured to drive the image sensor assembly 16 to move to compensate for the hand shake.

In practical application, an acceleration sensor is usually arranged in the electronic device, and the movement direction and the movement amount of the electronic device are detected by the acceleration sensor. For example, the acceleration sensor detects the direction and amount of shaking of the user hand during capturing, and transmits the shaking signal to the processor in the circuit board 4. The processor determines, according to the shaking signal, the direction and the amount of movement required for compensation by the image sensor assembly 16, controls directions and magnitudes of currents in different SMA wires 143, and adjusts contraction directions and contraction amounts of different SMA wires 143, thereby controlling the movement direction and the movement amount of the driving member 142. The driving member 142 is configured to drive the image sensor assembly 16 to move, so as to compensate for the interference of hand shaking of the user during capturing, alleviate the blurring of the image, and enhance the quality of the image.

In addition, it should be noted that a light exit hole 144 extends through the fixed member 141 and the driving member 142. The light exit hole 144 corresponds to a light exit side of the lens 13, and the image sensor assembly 16 is located below the light exit hole 144. The light emitted from the light exit side of the lens 13 passes through the light exit hole 144 and is projected on the image sensor assembly 16.

With reference to FIG. 7, in some embodiments, a protruding portion 1411a is arranged on a side surface of the fixed member 141 facing the driving member 142. The protruding portion 1411a protrudes toward the driving member 142. A position on the surface of the driving member 142 corresponding to the protruding portion 1411a is in contact with the fixed member 141, and a slit exists between other portions of the driving member 142 and the fixed member 141. In this way, when the driving member 142 moves relative to the fixed member 141, only the portion opposite to the protruding portion 1411a comes into contact with the fixed member 141, which weakens the blocking effect of the fixed member 141 on the movement of the driving member 142 and ensures the flexible movement of the driving member 142.

At least two protruding portions 1411a may be arranged on the fixed member 141. The two protruding portions 1411a are arranged opposite to each other, and are respectively in contact with two opposite sides of the driving member 142, so that the balance of the driving member 142 is ensured. The driving member 142 can drive the image sensor assembly 16 to move smoothly. In addition, a number of the protruding portions 1411a arranged on the fixed member 141 may further be four, six, eight, or the like. A plurality of protruding portions 1411a may be arranged opposite to each other in pairs, which is not specifically limited in this embodiment.

Referring to FIG. 11 and FIG. 12, in this embodiment, the SMA wire 143 is fixed by claws on the fixed member 141 and the driving member 142. Specifically, two sets of first claws 1413 are arranged on the fixed member 141. The two sets of first claws 1413 are arranged opposite to each other. Two sets of second claws 1421 are arranged on the driving member 142. The two sets of second claws 1421 are arranged opposite to each other. The first claws 1413 and the second claws 1421 are arranged at intervals. In this way, the first claws 1413 and the second claws 1421 are arranged adjacent to each other. One end of the SMA wire 143 is connected to each of the first claws 1413 of the fixed member 141, and an other end of the SMA wire 143 is connected to each of the second claws 1421 of the driving member 142.

An outer contour of the first driving assembly 14 is a rectangle by way of example. The two sets of first claws 1413 are respectively located at two opposite corners of the first driving assembly 14, and the two sets of second claws 1421 are respectively located at other two opposite corners of the first driving assembly 14. Moreover, the two sets of first claws 1413 are arranged on the fixed member 141, and the two sets of second claws 1421 are arranged on the driving member 142. For the SMA wires 143, the SMA wires 143 are located on side edges of the first driving assembly 14. One ends of the SMA wires 143 are connected to the first claws 1413 at the corners of the fixed member 141, and other ends of the SMA wires 143 are connected to the second claws 1421 at the corners of the driving member 142.

In an implementation, the first driving assembly 14 may include two SMA wires 143 arranged adjacent or opposite to each other.

The two SMA wires 143 are arranged adjacent to each other by way of example. Referring to FIG. 12, the SMA wire 143 on an upper side in the figure is defined as a first SMA wire 1431, and the SMA wire 143 on a right side in the figure is defined as a second SMA wire 1432. Adjacent ends of the first SMA wire 1431 and the second SMA wire 1432 are both connected to the same second claw 1421 of the driving member 142, and an other end of the first SMA wire 1431 and an other end of the second SMA wire 1432 are respectively connected to two first claws 1413 of the fixed member 141. According to the amount and the direction of displacement required for compensation by the driving member 142, only one of the first SMA wire 1431 and the second SMA wire 1432 may be contracted, or both the first SMA wire 1431 and the second SMA wire 1432 may be contracted. When the first SMA wire 1431 and the second SMA wire 1432 are both contracted, the contraction amounts of the two SMA wires may be consistent or inconsistent.

It should be noted that only two SMA wires 143 are arranged in the first driving assembly 14, and when the two SMA wires 143 are arranged adjacent to each other, since adjacent ends of the two SMA wires 143 are connected to the same first claw 1413 or the same second claw 1421, only one first claw 1413 may be arranged on the fixed member 141, and two second claws 1421 may be arranged on the driving member 142. Alternatively, two first claws 1413 are arranged on the fixed member 141, and only one second claw 1421 is arranged on the driving member 142. In order to facilitate the arrangement of the two SMA wires 143, two first claws 1413 are arranged on the fixed member 141, and two second claws 1421 is arranged on the driving member 142.

The two SMA wires 143 are arranged opposite to each other by way of example. Still referring to FIG. 12, the SMA wire 143 located on a lower side in the figure is defined as a third SMA wire 1433. The first SMA wire 1431 and the third SMA wire 1433 are arranged in the first driving assembly 14 by way of example. Two ends of the first SMA wire 1431 are respectively connected to the first claw 1413 and the second claw 1421 adjacent to each other, and two ends of the third SMA wire 1433 are respectively connected to the other first claw 1413 and the other second claw 1421. According to the amount and the direction of displacement required for compensation by the driving member 142, only one of the first SMA wire 1431 and the third SMA wire 1433 may be contracted, or both the first SMA wire 1431 and the third SMA wire 1433 may be contracted. When the first SMA wire 1431 and the third SMA wire 1433 are both contracted, the contraction amounts of the two SMA wires may be consistent or inconsistent.

Referring to FIG. 12, in another implementation, the first driving assembly 14 may include four SMA wires 143. An outer contour of the first driving assembly 14 is a rectangle by way of example. The SMA wires 143 are arranged on four sides of the first driving assembly 14. Therefore, the SMA wires 143 are connected to both sides of each set of first claws 1413, and connected to both sides of each set of second claws 1421. One set of first claws 1413 are used as an example. The two SMA wires 143 connected to both sides of the first claws 1413 are respectively connected to the second claws 1421 on both sides. According to the amount and the direction of displacement required for compensation by the driving member 142, one of the four SMA wires 143 may be contracted, or at least two of the SMA wires 143 are contracted. When more than two SMA wires 143 are contracted, the contraction amounts of different SMA wires 143 may be consistent or inconsistent.

Referring to FIG. 11 and FIG. 12, in order to facilitate the connection of the SMA wires 143 on both sides of the first claw 1413, the first claw 1413 may include a first engagement portion 1413a and a second engagement portion 1413b arranged separately. The first engagement portion 1413a and the second engagement portion 1413b are both located at the same corner of the fixed member 141, and respectively correspond to two adjacent side edges of the fixed member 141. The first claw 1413 in the upper left corner of FIG. 12 is used as an example. A part of the first claw 1413 at the upper right position is defined as the first engagement portion 1413a, and a part of the first claw 1413 at the lower left position is defined as the second engagement portion 1413b. The first engagement portion 1413a is connected to an end of the SMA wire 143 on the upper side, and the second engagement portion 1413b is connected to an end of the SMA wire 143 on the lower side.

In addition, corresponding to the first engagement portion 1413a and the second engagement portion 1413b of the first claw 1413, the second claw 1421 may also include two parts. For example, the second claw 1421 includes a first engagement end 1421a and a second engagement end 1421b. The first engagement end 1421a and the second engagement end 1421b are respectively connected to one ends of the SMA wires 143 on two adjacent sides.

Referring to FIG. 12, in this embodiment, a limiting space may be formed between the first engagement portion 1413a and the second engagement portion 1413b of the first claw 1413. The limiting space is configured to limit the movement range of the driving member 142, for example, limit a translation distance range or a rotation angle range of the driving member 142. In practical application, when the user takes a picture, the amplitude of hand shaking is often small, and a movement range and a deflection angle for compensation required by the driving member 142 are also small. Therefore, the movement of the driving member 142 may be limited within a certain range. In this way, the driving member 142 moves more smoothly within a small range, and can prevent the SMA wire 143 from being stretched or twisted excessively, so as to ensure that the SMA wire 143 can maintain desirable working performance for a long time.

Specifically, a limiting portion 1422 is arranged on the driving member 142. The limiting portion 1422 corresponds to the limiting space between the first engagement portion 1413a and the second engagement portion 1413b. The limiting portion 1422 is located in the limiting space between the first engagement portion 1413a and the second engagement portion 1413b, and is movable in the limiting space. For example, the limiting portion 1422 can translate or rotate. For example, the limiting portion 1422 may be an extension extending outward from the edge of the driving member 142. For example, the extension is located at a corner of the driving member 142, and may extend outward toward the driving member 142 along the plane of the driving member 142.

Referring to FIG. 12, as a specific implementation, a hollowed-out area 1423 is arranged around the limiting portion 1422 on the driving member 142. The hollowed-out area 1423 can reduce a weight of the driving member 142 and improve the movement flexibility of the driving member 142. In addition, the hollowed-out area 1423 may extend from the limiting portion 1422 to both sides of the limiting portion 1422, so that the limiting portion 1422 and both sides of the limiting portion 1422 form a bent elastic arm. In this way, when the driving member 142 moves until the limiting portion 1422 comes into contact with the first engagement portion 1413a or the second engagement portion 1413b, the limiting portion 1422 continues to move by a certain distance along the original direction by deformation of the limiting portion, which increases the movement range of the driving member 142.

As described above, the limiting portion 1422 on the driving member 142 may extend outward along the plane where the driving member 142 is located. Since the fixed member 141 and the driving member 142 are stacked, in order to realize the limiting effect of the first engagement portion 1413a and the second engagement portion 1413b on the limiting portion 1422, referring to FIG. 12, the first engagement portion 1413a and the second engagement portion 1413b may each include a bent portion 1413c. The first engagement portion 1413a and the second engagement portion 1413b are both connected to the fixed member 141 by the bent portion 1413c. The bent portion 1413c is bent toward the driving member 142. The first engagement portion 1413a and the second engagement portion 1413b are bent, by the bent portion 1413c, to the plane where the driving member 142 is located. In this way, the first engagement portion 1413a and the second engagement portion 1413b are both in a same plane as the limiting portion 1422, and the limiting portion 1422 is located in the limiting space between the first engagement portion 1413a and the second engagement portion 1413b. The limiting portion 1422 can move to abut against the first engagement portion 1413a or the second engagement portion 1413b to limit the limiting portion 1422.

Figure 13:
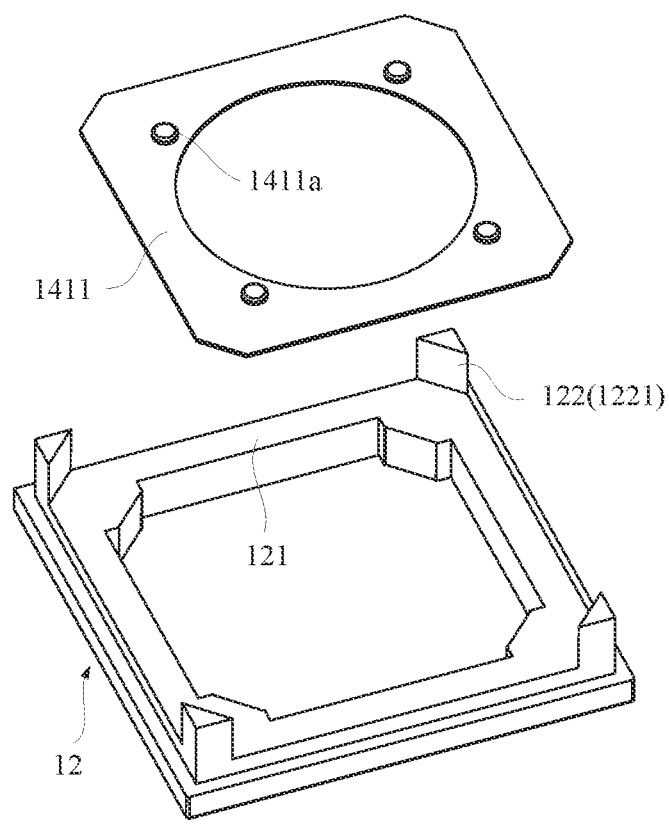
FIG. 13 is an exploded view of a fixing bracket and a substrate of a fixed member according to an embodiment of this application.

Since the first claw 1413 on the fixed member 141 has the bent portion 1413c bent toward the driving member 142, in order to facilitate the processing and assembly of the fixed member 141, in some embodiments, the fixed member 141 may include a substrate 1411 and a conductive plate 1412. The conductive plate 1412 is fixed to the substrate 1411 to form the fixed member 141 together. FIG. 13 is an exploded view of a fixing bracket and a substrate 1411 of a fixed member according to an embodiment of this application. Referring to FIG. 9 and FIG. 13, one side surface of the substrate 1411 of the fixed member 141 is fixedly connected to the fixing bracket 12. For example, one side surface of the substrate 1411 is fixed to the surface of the first fixing portion 121 facing the bottom plate 112 of the shell 11, and the conductive plate 1412 is fixed to an other side surface of the substrate 1411. The first claw 1413 and the second claw 1421 of the fixed member 141 are both arranged on the conductive plate 1412, and the SMA wire 143 is connected between the conductive plate 1412 and the driving member 142.

For example, the substrate 1411 of the fixed member 141 may be a flat metal member or a plastic member, and the conductive plate 1412 may be a metal member. The conductive plate 1412 may be welded or bonded to the substrate 1411, and the driving member 142 is a metal member. In this way, the conductive plate 1412 or the driving member 142 may be electrically connected to an external circuit (for example, the circuit board 4 of an electronic device) to apply a current to the SMA wire 143. The fixed conductive plate 1412 may be electrically connected to the external circuit. For example, refer to FIG. 11 or FIG. 12, the conductive plate 1412 has an electrical connection terminal 1412a thereon, and the electrical connection terminal 1412a of the conductive plate 1412 is electrically connected to the circuit board 4 by a flexible wire. In this way, the moving driving member 142 is prevented from being electrically connected to the external circuit, so as to avoid damage to the flexible wire.

In addition, referring to FIG. 13, for the protruding portion 1411a arranged on the fixed member 141, the protruding portion 1411a may be arranged on the substrate 1411. Referring to FIG. 11, an avoidance area 1412b may be arranged corresponding to the protruding portion 1411a on the conductive plate 1412. The avoidance area 1412b is configured to avoid the protruding portion 1411a, so that the protruding portion 1411a comes into contact with the driving member 142. In addition, when the driving member 142 moves relative to the fixed member 141, the movement of the driving member 142 may be limited by the blocking effect of an edge of the avoidance area 1412b on the protruding portion 1411a.

In other implementations, a limiting structure may further be arranged on the bottom plate 112 of the shell 11 or other positions in the shell 11 to limit the movement of the image sensor assembly 16, thereby limiting the movement range of the driving member 142.

Specifically, a plurality of conductive plates 1412 may be arranged. All of the conductive plates 1412 are fixed to the substrate 1411. Different first claws 1413 may be located on different conductive plates 1412. For example, two conductive plates 1412 are arranged, and two first claws 1413 are respectively located on two conductive plates 1412. For example, referring to FIG. 11, the fixed member 141 may include four conductive plates 1412. The first engagement portion 1413a or the second engagement portion 1413b of the first claw 1413 is arranged on each of the conductive plates 1412. The four conductive plates 1412 jointly form two first claws 1413, which facilitates processing of the first claws 1413. An electrical connection terminal 1412a may be arranged on each conductive plate 1412, and each conductive plate 1412 is electrically connected to an external circuit.

Referring to FIG. 8, in this embodiment, the second driving assembly 15 includes a support seat 151 and a second driving coil 152. The support seat 151 is sleeved on an outer wall of the lens 13 for supporting the lens 13. For example, the outer wall of the lens 13 may be provided with external threads, and an inner wall of the support seat 151 is provided with internal threads. The support seat 151 is threadedly connected to the outer wall of the lens 13. The second driving coil 152 is sleeved on the outer wall of the support seat 151, and the second driving coil 152 is fixedly connected to the support seat 151.

Figure 14:
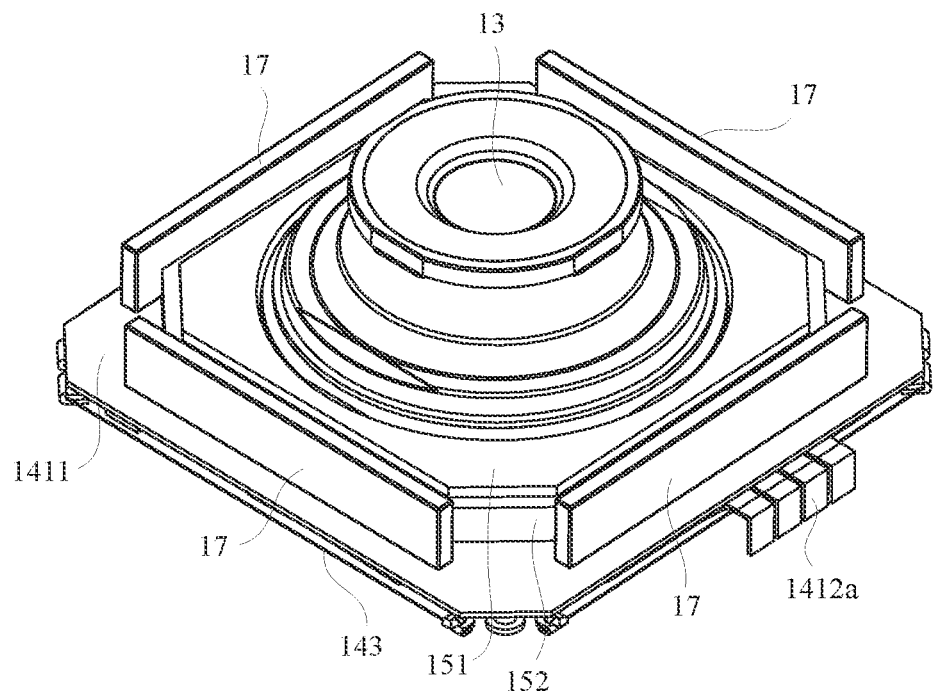
FIG. 14 is a schematic structural diagram of FIG. 8 with the fixing bracket removed.

FIG. 14 is a schematic structural diagram of FIG. 8 with the fixing bracket removed. Referring to FIG. 14, the magnetic member 17 fixed to the inner edge of the first fixing portion 121 faces the second driving assembly 15. Specifically, the magnetic member 17 faces the second driving coil 152. The second driving coil 152 may be electrically connected to the circuit board 4 in the electronic device. When the user holds the electronic device for performing capturing, the circuit board 4 controls the second driving coil 152 to operate, and the second driving coil 152 is energized to generate an electromagnetic field. A magnetic force is generated between the second driving coil 152 and the magnetic member 17, and drives the second driving coil 152 to move. The second driving coil 152 is configured to drive, by using the support seat 151, the lens 13 to move.

The user inputs a capturing instruction when capturing an image. For example, the user inputs a focusing instruction by operating a display interface of the electronic device, and the circuit board 4 in the electronic device receives the focusing instruction, and controls a direction and a magnitude of the current in the second driving coil 152 to adjust the magnetic field direction and the magnitude of the magnetic force generated between the second driving coil 152 and the magnetic member 17, thereby controlling the movement direction and the movement amount of the second driving assembly 15. The second driving assembly 15 is configured to drive the lens 13 to move. For example, the second driving assembly 15 drives the lens 13 to move along an optical axis of the lens to focus on a to-be-captured object.

In addition, in order to generate a balanced magnetic force between the second driving coil 152 and each position of the magnetic member 17, an area of the surface of the second driving coil 152 facing the magnetic member 17 may be parallel to the surface of the magnetic member 17. Referring to FIG. 8, four magnetic members 17 are arranged at equal intervals along a circumferential direction of the inner edge of the first fixing portion 121 by way of example. The second driving wire may be a substantially rectangular coil, and each side of the second driving coil 152 corresponds to the magnetic member 17. Alternatively, six or eight magnetic members 17 are arranged at equal intervals along a circumferential direction of the inner edge of the first fixing portion 121, and the second driving coil 152 is correspondingly a substantially hexagonal coil or an octagonal coil.

The support seat 151 may be an annular structural member sleeved on the outer wall of the lens 13, and a partial area of the inner wall of the second driving coil 152 is fixedly connected to the support seat 151. Alternatively, referring to FIG. 9, an outer contour of the support seat 151 may be a shape matching the second driving coil 152. For example, the outer contour of the support seat 151 is substantially rectangular, hexagonal, or octagonal.

Referring to FIG. 4, in the camera module 1 provided in this embodiment, the image sensor assembly 16 includes an image sensor 161 and a flexible electrical connector 162. The image sensor 161 is located on a light exit side of the lens 13. For example, the optical axis of the lens 13 passes through the center of the image sensor 161. The light emitted from the lens 13 is projected on the image sensor 161, and the image sensor 161 converts the light emitting signal to an electrical signal by photovoltaic conversion, so as to realize the imaging function of the camera module 1.

The flexible electrical connector 162 is configured to electrically connect the image sensor 161 to an external circuit, and then control, by using the external circuit, the image sensor to operate. Specifically, one end of the flexible electrical connector 162 is connected to the image sensor 161, and an other end of the flexible electrical connector 162 is connected to the external circuit. For example, the other end of the flexible electrical connector 162 is connected to the circuit board 4 in the electronic device. During capturing by the user, a processor on the circuit board 4 controls the image sensor 161 to operate.

The image sensor 161 generates heat during operation, and the heat is collected on the image sensor 161, which affects the performance of the image sensor 161. In severe cases, the image sensor 161 cannot operate properly. Therefore, heat of the image sensor 161 needs to be dissipated. In the related art, the image sensor 161 dissipates heat through an air gap between the image sensor and the bottom of the shell 11, and the heat dissipation efficiency is low. Therefore, the image sensor 161 cannot operate in a high power consumption mode for a long time. For example, after 5 minutes since the user started the camera on the electronic device, the image sensor 161 enters a thermal protection mode and stops working.

Figure 15:
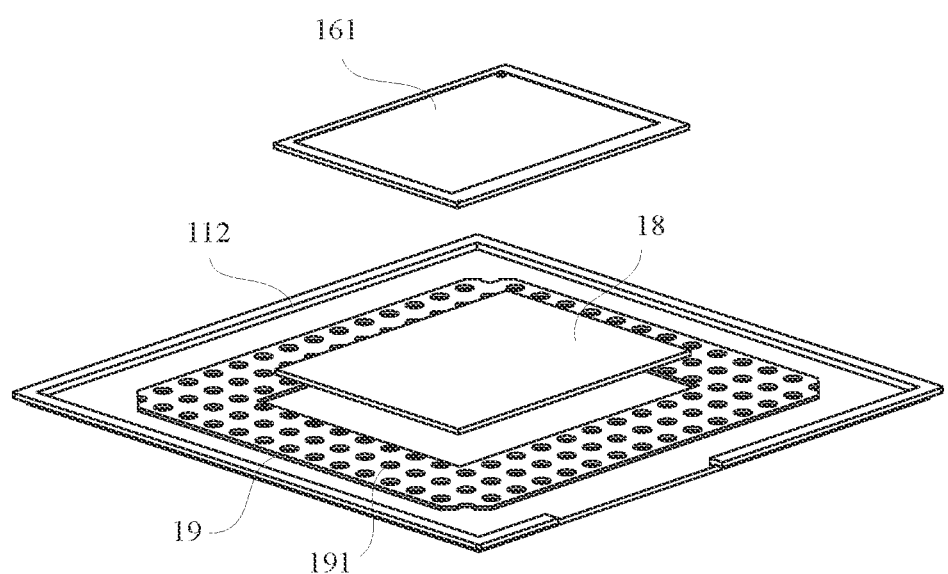
FIG. 15 is an exploded view of an image sensor in contact with a bottom plate according to an embodiment of this application.

FIG. 15 is an exploded view of an image sensor in contact with a bottom plate according to an embodiment of this application. Referring to FIG. 6 and FIG. 15, in this embodiment, a gap exists between a heat dissipation surface of the image sensor 161 (a side surface of the image sensor 161 facing the inner bottom wall of the shell 11) and the inner bottom wall (the bottom plate 112) of the shell 11. The gap is filled with a heat transfer fluid 18, and heat of the image sensor 161 is dissipated by using the beat transfer fluid 18.

The heat from the heat dissipation surface of the image sensor 161 is transferred to the heat transfer fluid 18 by thermal conduction, and the heat transfer fluid 18 transfers the heat to the bottom plate 112, and dissipates heat to the outside through the bottom plate 112, thereby dissipating heat of the image sensor 161. The thermal conduction of the heat transfer fluid 18 can enhance the heat dissipation efficiency of the image sensor 161 and improve the heat dissipation effect of the image sensor 161, thereby ensuring the working performance of the image sensor 161.

Referring to FIG. 15, an annular sealing plate 19 is attached to the bottom plate 112 of the shell 11, and the heat transfer fluid 18 is located in an area surrounded by the annular sealing plate 19. The heat transfer fluid 18 is a flowable liquid. The annular sealing plate 19 is arranged on the bottom plate 112 of the shell 11, and the heat transfer fluid 18 is confined to the area defined by the annular sealing plate 19. The area defined by the annular sealing plate 19 may correspond to the heat dissipation surface of the image sensor 161. In this way, the area where the heat transfer fluid 18 is located corresponds to the heat dissipation surface of the image sensor 161 to ensure the thermal conduction effect of the heat transfer fluid 18 on the image sensor 161.

In order to cause the heat transfer fluid 18 to come into full contact with the heat dissipation surface of the image sensor 161, a spacing may exist between the annular sealing plate 19 and the heat dissipation surface of the image sensor 161. The liquid level of the heat transfer fluid 18 may be higher than the surface of the annular sealing plate 19. It should be noted that since the slit between the annular sealing plate 19 and the image sensor 161 is small, the heat transfer fluid 18 may be prevented from overflowing to outside of the annular sealing plate 19 by the surface tension of the heat transfer fluid 18 in the slit.

In addition, after the heat transfer fluid 18 absorbs the heat of the image sensor 161, the temperature rises, and the volume of the heat transfer fluid expand to a certain extent, causing the heat transfer fluid 18 to overflow outward. The slit between the annular sealing plate 19 and the image sensor 161 can accommodate the expansion amount of the heat transfer fluid 18, and the capillary action of the slit can confine the heat transfer fluid 18 to the area where the annular sealing plate 19 is located, so as to avoid affecting other devices of the camera module 1 caused by the heat transfer fluid 18 overflowing out of the annular sealing plate 19.

Referring to FIG. 15, in an implementation, a plurality of sealing holes 191 may be provided at intervals on the annular sealing plate 19. The plurality of sealing holes 191 are provided. When the heat transfer fluid 18 overflows toward along the surface of the annular sealing plate 19, the heat transfer fluid 18 enters each sealing hole 191, and the heat transfer fluid 18 is sealed and stored in the sealing holes 191, so as to prevent the heat transfer fluid 18 from overflowing to the outside of the annular sealing plate 19.

In other implementations, the surface of the annular sealing plate 19 may be an uneven corrugated surface as a substitution of the sealing hole 191. When the heat transfer fluid 18 overflows along the surface of the annular sealing plate 19, a recessed area between two adjacent protrusions of the corrugated surface is used to store the heat transfer fluid 18. A slit is formed between a top portion of a protruding area of the corrugated surface and the image sensor 161. The surface tension of the heat transfer fluid 18 in the slit can prevent the heat transfer fluid 18 from diffusing outward. Therefore, the corrugated surface can prevent the heat transfer fluid 18 from overflowing to the outside of the annular sealing plate 19.

When a corrugated surface is processed on the surface of the annular sealing plate 19 to seal and store the heat transfer fluid 18, in order to prevent the heat transfer fluid 18 from flowing to an end portion of the annular sealing plate 19 along the recessed area of the corrugated surface, a stop edge may be arranged on an outer edge of the annular sealing plate 1919. A height of the stop edge is greater than a thickness of the recessed area of the corrugated surface. For example, the stop edge is flush with a top portion of the recessed area of the corrugated surface.

In addition, an extending direction of the corrugation of the corrugated surface (the extending direction of the protruding area and the recessed area) may be consistent with an extending direction of each side edge of the annular sealing plate 19. The annular sealing plate 19 is a rectangular frame structure by way of example. The extending direction of the corrugation of the corrugated surface on one side of the annular sealing plate 19 is consistent with the extending direction of the side edge. In this way, the heat transfer fluid 18 needs to cross the protrusions on the corrugated surface to reach the adjacent recessed area when overflowing outward, and the corrugated surface can effectively prevent the heat transfer fluid 18 from overflowing outward.

Figure 16:
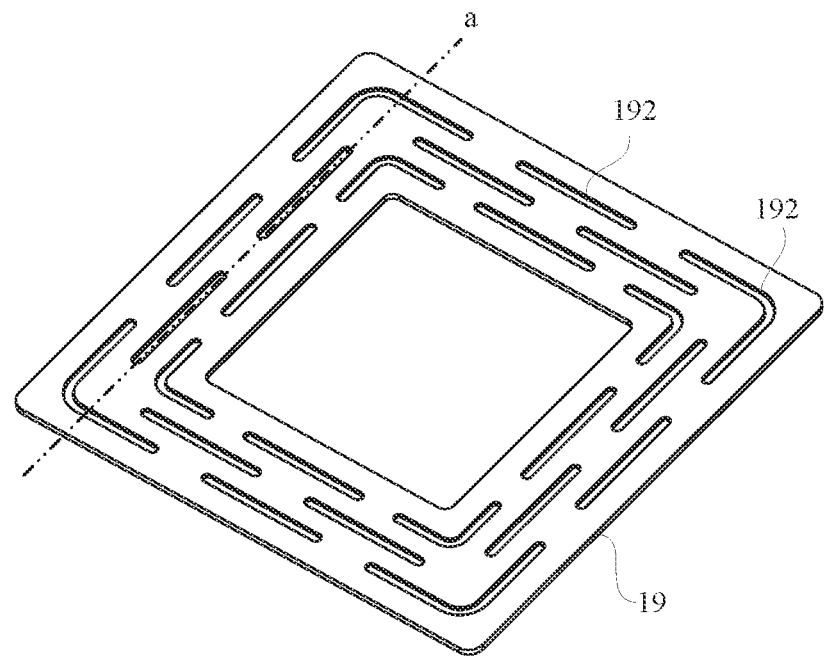
FIG. 16 is a schematic structural diagram of an annular sealing plate according to an embodiment of this application.

FIG. 16 is a schematic structural diagram of an annular sealing plate according to an embodiment of this application. Referring to FIG. 16, in another implementation, a plurality of elongated grooves 192 may further be provided at intervals on the surface of the annular sealing plate 19 as the substitution of the sealing hole 191. The elongated grooves 192 extend along a direction of a contour line of the annular sealing plate 19. The contour of the annular sealing plate 19 is a rectangular frame by way of example. The elongated grooves 192 may extend along a side length direction of the annular sealing plate 19. The elongated grooves 192 located at the corners of the annular sealing plate 19 may extend to both sides. For example, the elongated grooves 192 located at the corners of the annular sealing plate 19 are vertically curved elongated grooves 192.

In such an arrangement, when the heat transfer fluid 18 overflows, the elongated grooves 192 can store the heat transfer fluid 18. Moreover, since an extending direction of the elongated grooves 192 is substantially perpendicular to the overflowing direction of the heat transfer fluid 18, the elongated grooves 192 can prevent the heat transfer fluid 18 from overflowing outward.

It may be understood that, the elongated grooves 192 are provided on the surface of the annular sealing plate 19 at intervals, adjacent elongated grooves 192 are not in communication with each other. Therefore, the impact on the strength of the annular sealing plate 19 is small, and the annular sealing plate 19 can be prevented from being bent or even broken. In addition, as shown in FIG. 16, the annular sealing plate 19 is bent along the line a by way of example. Since the extending direction of the elongated grooves 192 at two ends of the bent part is perpendicular to the extending direction of the elongated grooves 192 in the middle, the strength of the annular sealing plate 19 may be enhanced.

In addition, as shown in FIG. 16, a plurality of rows of elongated grooves 192 may be provided at intervals from the inner edge to the outer edge of the annular sealing plate 19, and the elongated grooves 192 in different rows are staggered relative to each other. In this way, the adjacent elongated grooves 192 are also staggered relative to each other at intervals in the direction from the inner edge to the outer edge of the annular sealing plate 19. When the heat transfer fluid 18 in the elongated groove 192 close to the inner edge overflows, the heat transfer fluid 18 overflows from the end of the elongated groove 192 to the elongated groove 192 close to the outer edge for storage, which can prevent the heat transfer fluid 18 from overflowing.

For example, the annular sealing plate 19 may be a rubber plate or a silica gel plate. A plurality of sealing holes 191 are provided at intervals on the annular sealing plate 19 by way of example. The annular sealing plate 19 is a porous rubber plate or a porous silica gel plate.

Figure 17:
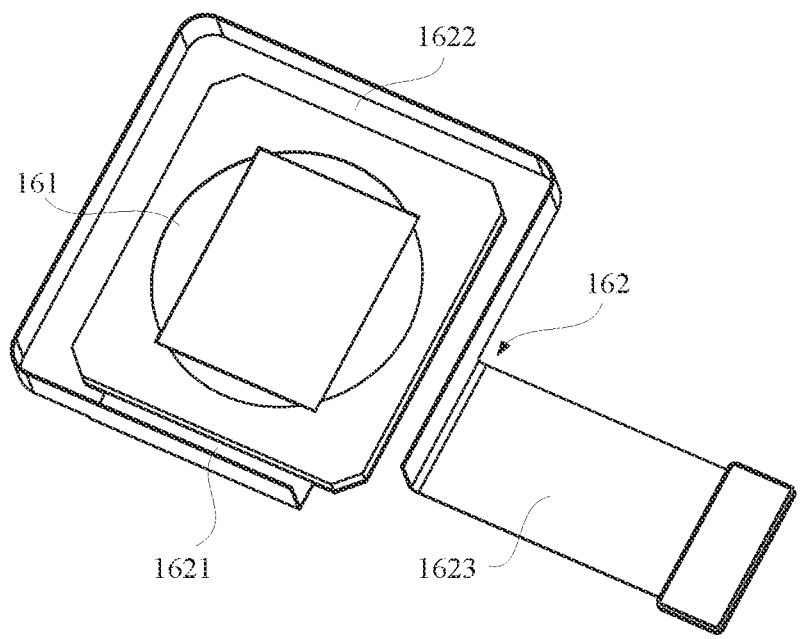
FIG. 17 is a schematic structural diagram of an image sensor assembly according to an embodiment of this application.

FIG. 17 is a schematic structural diagram of an image sensor assembly according to an embodiment of this application. Referring to FIG. 17, a flexible electrical connector 162 connected to the image sensor 161 may include a connecting portion 1621, a movable cantilever 1622, and a mounting portion 1623. The connecting portion 1621 is connected to the image sensor 161, the mounting portion 1623 is connected to an external circuit (for example, the circuit board 4 of an electronic device), and the movable cantilever 1622 is located between the connecting portion 1621 and the mounting portion 1623.

The connecting portion 1621 is connected to a side surface of the image sensor 161, and the movable cantilever 1622 extends around the image sensor 161 and is located inside the shell 11 of the camera module 1. One end of the mounting portion 1623 is connected to the movable cantilever 1622, the mounting portion 1623 extends out of the shell 11, the mounting portion 1623 extends toward the circuit board 4, and an other end of the mounting portion 1623 is connected to the circuit board 4. For example, an end portion of the mounting portion 1623 is connected to the circuit board 4 by an electrical connector.

The movable cantilever 1622 is a movable part of the flexible electrical connector 162. When the image sensor 161 moves with the first driving assembly 14, the movable cantilever 1622 deforms and moves accordingly, so as to prevent the flexible electrical connector 162 from restricting the movement of the image sensor 161.

In this embodiment, the movable cantilever 1622 may surround the image sensor 161 at least half a circle. For example, the connecting portion 1621 is connected to a side edge of the side of the image sensor 161, and the movable cantilever 1622 extends to an adjacent side edge around the image sensor 161 from the side edge connected to the connecting portion 1621. In this way, the movable cantilever 1622 includes at least two parts extending along different directions, so that the movable cantilever 1622 can cause the image sensor 161 to move toward any direction in a plane where the image sensor is located.

Referring to FIG. 17, in a specific implementation, the movable cantilever 1622 can surround the image sensor 161 a circle. For the flexible electrical connector 162 as a whole, an end of the flexible electrical connector 162 connected to the image sensor 161 surrounds the image sensor 161 a circle and then extends out of the shell 11. In this way, the movable cantilever 1622 can provide sufficient degrees of freedom for the image sensor 161, so that the movement of the image sensor 161 is not restricted. It should be noted that the movable cantilever 1622 is an elastic cantilever, and the movable cantilever 1622 can return to its original shape after deforming, so as to provide a reliable guarantee for the movement of the image sensor 161.

In addition, the connecting portion 1621 of the flexible electrical connector 162 may be flush with the surface of the image sensor 161, and the movable cantilever 1622 is perpendicular to the surface of the image sensor 161, which facilitates the deformation and movement of the movable cantilever 1622. Since the mounting portion 1623 extends out of the shell 11 and is connected to the circuit board 4, the mounting portion 1623 may be attached to an inner wall of a rear cover of the electronic device, and is also flush with the surface of the image sensor 161.

Referring to FIG. 6, in some embodiments, the image sensor assembly 16 may further include a light-transmitting plate 163. The light-transmitting plate 163 may be a transparent protective plate and is configured to protect the image sensor 161 from damage. Alternatively, the light-transmitting plate 163 may be a filter plate, and the light-transmitting plate 163 is configured to filter out light of a specific wavelength. For example, the light-transmitting plate 163 is configured to filter out invisible rays, for example, infrared rays or ultraviolet rays.

In the camera module 1 provided in this embodiment, the fixing bracket 12 is arranged in the shell 11. The fixing bracket 12 includes a first fixing portion 121 and a second fixing portion 122. The first fixing portion 121 is sleeved outside a lens 13. One end of the second fixing portion 122 is connected to a side of the first fixing portion 121 facing the bottom of the shell 11, and an other end of the second fixing portion 122 is supported on the bottom of the shell 11. The first driving assembly 14 is connected to the side of the first fixing portion 121 facing the bottom of the shell 11. The fixed member 141 of the first driving assembly 14 is fixed to the first fixing portion 121, the driving member 142 of the first driving assembly 14 is connected to the fixed member 141 by the shape memory alloy wires 143, the driving member 142 is driven to move by the shape memory alloy wires 143, and the driving member 142 is configured to drive the image sensor assembly 16 to move. The magnetic members 17 are fixed to the inner edge of the first fixing portion 121 and drive the second driving assembly 15 sleeved on the outer wall of the lens 13 to move, and the second driving assembly 15 is configured to drive the lens 13 to move. In this way, the first driving assembly 14 and the magnetic members 17 are all connected to the fixing bracket 12, thereby simplifying a structure of the camera module 1 and reducing the difficulty of assembling the camera module 1. In addition, the first driving assembly 14 and the second driving assembly 15 can be manufactured simultaneously and perform performance testing, so that the anti-shake performance of the camera module 1 can be accurately tested, thereby improving the reliability of the camera module 1.

This embodiment further provides a method for assembling a camera module. The assembling method is used for assembling the camera module 1 as described above. Specifically, the assembling method includes the following steps:

arranging a lens 13, and sleeving a second driving assembly 15 on an outer wall of the lens 13;

arranging a fixing bracket 12, where the fixing bracket 12 includes a first fixing portion 121 and a second fixing portion 122, the second fixing portion 122 is connected to a bottom surface of the first fixing portion 121, and at least one magnetic member 17 is fixed to an inner edge of the first fixing portion 121;

arranging a first driving assembly 14. The first driving assembly 14 includes a fixed member 141, a driving member 142, a shape memory alloy wire 143 connected between the fixed member 141 and the driving member 142. At least two shape memory alloy wires 143 are arranged, and each of the shape memory alloy wires 143 is located on a different side of the first driving assembly 14.

It may be understood that the second driving assembly 15 may be sleeved on the lens 13 and the magnetic member 17 may be fixed to the fixing bracket 12 successively. This embodiment does not limit the sequence of the process of arranging the first driving assembly 14, the process of assembling the lens 13 and the second driving assembly 15, and the process of assembling the fixing bracket 12 and the magnetic member 17. The first driving assembly 14 and the second driving assembly 15 may be manufactured simultaneously.

Then the fixing bracket 12 is sleeved outside the lens 13, so that the second driving assembly 15 on the outer wall of the lens 13 faces the magnetic member 17 on the inner edge of the first fixing portion 121.

Then, the first driving assembly 14 is connected to the fixing bracket 12, so that the fixed member 141 is fixed to the bottom surface of the first fixing portion 121.

After the first driving assembly 14 is assembled on the fixing bracket 12, the image sensor assembly 16 is fixed to the driving member 142 of the first driving assembly 14.

Finally, a shell 11 is sleeved outside the fixing bracket 12. The shell 11 may include an outer frame 111 and a bottom plate 112. The image sensor assembly 16 is supported on the bottom plate 112. The bottom plate 112 may be mounted to the bottom of the image sensor assembly 16, and then the outer frame 111 and the bottom plate 112 are fixedly connected.

It should be noted that after the assembly of the first driving assembly 14 and the second driving assembly 15 and the fixing bracket 12 is completed, the performance of the first driving assembly 14 and the second driving assembly 15 can be tested. In this way, the accuracy of the overall driving performance test of the first driving assembly 14 and the second driving assembly 15 can be improved, the anti-shake performance of the camera module 1 can be accurately tested, and the reliability of the camera module 1 can be improved. After the driving performance test of the first driving assembly 14 and the second driving assembly 15 is completed, the image sensor assembly 16 is assembled on the first driving assembly 14, and the image sensor assembly 16 can be processed and manufactured separately, which can reduce production costs of the image sensor assembly 16.

In the description of the embodiments of this application, it should be noted that unless otherwise explicitly specified or defined, the terms such as "mount", "connect", and "connection" should be understood in a broad sense. For example, the connection may be a fixed connection, or an indirect connection through an intermediary, or may be an internal communication between two components or an interactive relationship between two components. A person of ordinary skill in the art may understand the specific meanings of the foregoing terms in the embodiments of this application according to specific situations.

In the specification of the embodiments of this application, claims, and accompanying drawings, the terms "first", "second", "third", "fourth", and so on (if existing) are intended to distinguish between similar objects but do not necessarily indicate a specific order or sequence.

What is claimed is:

1. A camera module, comprising: a shell, a fixing bracket, a lens, a first driving assembly, a second driving assembly, and an image sensor assembly, wherein a mounting hole is provided on a side surface of the shell, a part of the lens is accommodated in the shell through the mounting hole, the fixing bracket is arranged in the shell, the image sensor assembly is located on a bottom of the shell, the fixing bracket comprises a first fixing portion and a second fixing portion, the first fixing portion is sleeved outside the lens, one end of the second fixing portion is connected to a side of the first fixing portion facing the bottom of the shell, another end of the second fixing portion is supported on an inner bottom wall of the shell, and at least one magnetic member is fixed to an inner edge of the first fixing portion;

the first driving assembly comprises a fixed member, a driving member, and at least two shape memory alloy wires, the fixed member and the driving member are stacked along a direction of an optical axis of the lens, the fixed member is fixed to a surface of the first fixing portion facing the bottom of the shell, the driving member is fixedly connected to an image sensor, the shape memory alloy wires are respectively located on different sides of the first driving assembly, one ends of the shape memory alloy wires are connected to the fixed member, other ends of the shape memory alloy wires are connected to the driving member, and the shape memory alloy wires are configured to drive, by extension and retraction of the shape memory alloy wires, the driving member to move; the fixed member has two sets of first claws, the two sets of first claws are arranged opposite to each other, the driving member has two sets of second claws, the two sets of second claws are arranged opposite to each other, and the first claws and the second claws are arranged at intervals, wherein the one ends of the shape memory alloy wires are connected to the first claws, and the other ends of the shape memory alloy wires are connected to the second claws; and the second driving assembly is sleeved on an outer wall of the lens and faces the magnetic member, and the magnetic member is configured to drive the second driving assembly to move.

2. The camera module according to claim 1, wherein the second fixing portion comprises a plurality of support portions arranged at intervals, and the first driving assembly and the image sensor assembly are located in a space defined by the plurality of support portions.

3. The camera module according to claim 1, wherein at least two magnetic members are fixed to the inner edge of the first fixing portion, and the two magnetic members are respectively arranged on two opposite sides of the first fixing portion.

4. The camera module according to claim 1, wherein at least two protruding portions are arranged opposite to each other on the fixed member, each of the protruding portions protrudes toward the driving member, and a position on the driving member corresponding to the protruding portion is in contact with the fixed member.

5. The camera module according to claim 1, wherein the first driving assembly comprises two shape memory alloy wires arranged adjacent or opposite to each other.

6. The camera module according to claim 5, wherein the first claws comprise a first engagement portion and a second engagement portion arranged separately, the first engagement portion and the second engagement portion are respectively connected to one ends of the shape memory alloy wires on two adjacent sides, and a limiting space is formed between the first engagement portion and the second engagement portion; and the driving member has a limiting portion located in the limiting space and movable in the limiting space.

7. The camera module according to claim 6, wherein the first engagement portion and the second engagement portion each comprise a bent portion, and are both connected to the fixed member by the bent portion, and the bent portion is bent toward the driving member.

8. The camera module according to claim 6, wherein the fixed member comprises a substrate and at least one conductive plate, one side surface of the substrate is fixedly connected to the first fixing portion, and the conductive plate is fixed to another side surface of the substrate; and the protruding portions are arranged on the substrate, and the first claws and the second claws are arranged on the conductive plate.

9. The camera module according to claim 8, wherein the fixed member comprises four conductive plates, and the first engagement portions and the second engagement portions of the two sets of first claws are respectively located on different conductive plates.

10. The camera module according to claim 1, wherein the first driving assembly comprises four shape memory alloy wires, and the shape memory alloy wires are connected to both sides of each set of first claws.

11. The camera module according to claim 1, wherein the second driving assembly comprises a support seat and a second driving coil, the support seat is sleeved on the outer wall of the lens, and the second driving coil is sleeved on an outer wall of the support seat.

12. The camera module according to claim 1, wherein the image sensor assembly comprises the image sensor, a gap exists between a heat dissipation surface of the image sensor and the inner bottom wall of the shell, and the gap is filled with a heat transfer fluid.

13. The camera module according to claim 12, wherein an annular sealing plate is attached to the inner bottom wall of the shell, and the heat transfer fluid is located in an area defined by the annular sealing plate.

14. The camera module according to claim 13, wherein a slit exists between the annular sealing plate and the image sensor.

15. The camera module according to claim 13, wherein a plurality of sealing holes are provided at intervals on the annular sealing plate, or a surface of the annular sealing plate is an uneven corrugated surface.

16. The camera module according to claim 13, wherein a plurality of elongated grooves are provided at intervals on the annular sealing plate, and the elongated grooves extend along a direction of a contour line of the annular sealing plate, wherein a plurality of rows of elongated grooves are provided from an inner edge to an outer edge of the annular sealing plate, and the elongated grooves in different rows are staggered.

17. The camera module according to claim 1, wherein the image sensor assembly further comprises a flexible electrical connector, one end of the flexible electrical connector is connected to the image sensor, and another end of the flexible electrical connector is configured to be connected to an external circuit.

18. The camera module according to claim 17, wherein the flexible electrical connector comprises a connecting portion, a movable cantilever, and a mounting portion, the connecting portion is connected to the image sensor, the mounting portion is connected to the external circuit, and the movable cantilever is located between the connecting portion and the mounting portion, wherein
the movable cantilever surrounds the image sensor at least half a circle.

19. A method for assembling a camera module, comprises:
arranging a lens;
sleeving a second driving assembly on an outer wall of the lens;
arranging a fixing bracket, wherein the fixing bracket comprises a first fixing portion and a second fixing portion, and the second fixing portion is connected to a bottom surface of the first fixing portion;
fixing at least one magnetic member to an inner edge of the first fixing portion;
sleeving, outside the lens, the fixing bracket having the magnetic member fixed thereto, wherein the second driving assembly faces the magnetic member;
arranging a first driving assembly, wherein the first driving assembly comprises a fixed member, a driving member, a shape memory alloy wire connected between the fixed member and the driving member, wherein at least two shape memory alloy wires are arranged, and each of the shape memory alloy wires is located on a different side of the first driving assembly;
fixing the fixed member to the bottom surface of the first fixing portion;
arranging an image sensor assembly, and fixing the image sensor assembly to the driving member; and
sleeving a shell outside the fixing bracket.

20. An electronic device, comprising:
a housing;
a display panel;
a circuit board; and
at least one camera module, wherein the camera module, comprises:
a shell, a fixing bracket, a lens, a first driving assembly, a second driving assembly, and an image sensor assembly, wherein a mounting hole is provided on a side surface of the shell, a part of the lens is accommodated in the shell through the mounting hole, the fixing bracket is arranged in the shell, the image sensor assembly is located on a bottom of the shell, the fixing bracket comprises a first fixing portion and a second fixing portion, the first fixing portion is sleeved outside the lens, one end of the second fixing portion is connected to a side of the first fixing portion facing the bottom of the shell, another end of the second fixing portion is supported on an inner bottom wall of the shell, and at least one magnetic member is fixed to an inner edge of the first fixing portion;

the first driving assembly comprises a fixed member, a driving member, and at least two shape memory alloy wires, the fixed member and the driving member are stacked along a direction of an optical axis of the lens, the fixed member is fixed to a surface of the first fixing portion facing the bottom of the shell, the driving member is fixedly connected to an image sensor, the shape memory alloy wires are respectively located on different sides of the first driving assembly, one ends of the shape memory alloy wires are connected to the fixed member, other ends of the shape memory alloy wires are connected to the driving member, and the shape memory alloy wires are configured to drive, by extension and retraction of the shape memory alloy wires, the driving member to move; the fixed member has two sets of first claws, the two sets of first claws are arranged opposite to each other, the driving member has two sets of second claws, the two sets of second claws are arranged opposite to each other, and the first claws and the second claws are arranged at intervals, wherein the one ends of the shape memory alloy wires are connected to the first claws, and the other ends of the shape memory alloy wires are connected to the second claws; and the second driving assembly is sleeved on an outer wall of the lens and faces the magnetic member, and the magnetic member is configured to drive the second driving assembly to move.

* * * * *